US012588051B2

(12) United States Patent
Nguyen et al.

(10) Patent No.:  US 12,588,051 B2
(45) Date of Patent:  Mar. 24, 2026

(54) TECHNIQUES FOR MANAGING IN-BAND WIRELESS COMMUNICATION BY USER EQUIPMENT COORDINATION

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US); Kapil Gulati, Belle Mead, NJ (US); Shuanshuan Wu, San Diego, CA (US); Hui Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 18/560,344

(22) PCT Filed: Jul. 30, 2021

(86) PCT No.: PCT/CN2021/109493
§ 371 (c)(1),
(2) Date: Nov. 10, 2023

(87) PCT Pub. No.: WO2023/004729
PCT Pub. Date: Feb. 2, 2023

(65) Prior Publication Data
US 2024/0365363 A1     Oct. 31, 2024

(51) Int. Cl.
*H04W 72/23*          (2023.01)
*H04B 17/318*        (2015.01)
(Continued)

(52) U.S. Cl.
CPC ........ *H04W 72/542* (2023.01); *H04B 17/328* (2023.05); *H04W 72/25* (2023.01); *H04W 72/40* (2023.01)

(58) Field of Classification Search
CPC . H04W 72/541; H04W 72/40; H04W 72/542; H04W 72/25; H04W 72/02; H04W 72/20; H04W 92/18; H04W 72/23
See application file for complete search history.

(56) References Cited

U.S. PATENT DOCUMENTS

2020/0229171 A1     7/2020   Khoryaev et al.
2020/0296668 A1*    9/2020   Xu ........................ H04W 72/20
(Continued)

FOREIGN PATENT DOCUMENTS

WO     WO-2020173536 A1     9/2020
WO     WO-2021007686 A1     1/2021
WO     WO-2021030612 A1     2/2021

OTHER PUBLICATIONS

International Search Report and Written Opinion—PCT/CN2021/109493—ISA/EPO—Apr. 29, 2022.
(Continued)

*Primary Examiner* — Andrew Lee
(74) *Attorney, Agent, or Firm* — Holland & Hart LLP

(57)          ABSTRACT

Methods, systems, and devices for wireless communications are described. User equipment (UE) may communicate sidelink coordination messages to indicate potential interference and select sidelink resources. For example, a first UE may transmit a sidelink coordination message to a second UE that includes a set of identifiers associated with a set of UEs. The second UE may select a first set of sidelink resources for a first sidelink communication with the first UE based on a reference signal received power (RSRP) of the sidelink coordination message and a reservation of a second set of sidelink resources for a second sidelink communication between the first UE and third UE of the set of UEs. For example, the second UE may determine the reservation, select the first set to be non-overlapping a time
(Continued)

domain with the second set based on the RSRP, and perform the second sidelink communication with the first UE.

27 Claims, 14 Drawing Sheets

(51) Int. Cl.
| | |
|---|---|
| *H04W 72/25* | (2023.01) |
| *H04W 72/40* | (2023.01) |
| *H04W 72/542* | (2023.01) |

(56) References Cited

U.S. PATENT DOCUMENTS

| | | | | |
|---|---|---|---|---|
| 2020/0413295 | A1 | 12/2020 | Li et al. | |
| 2022/0159752 | A1* | 5/2022 | Farag | H04W 76/14 |
| 2022/0322301 | A1* | 10/2022 | Kiilerich Pratas | H04W 72/20 |
| 2022/0322359 | A1* | 10/2022 | Ye | H04W 72/02 |
| 2023/0239837 | A1* | 7/2023 | Ye | H04W 72/02 |
| | | | | 370/329 |
| 2023/0247589 | A1* | 8/2023 | Dong | H04W 72/25 |
| | | | | 370/329 |
| 2023/0247654 | A1* | 8/2023 | Zhang | H04L 5/0092 |
| | | | | 370/329 |
| 2023/0267337 | A1* | 8/2023 | Esmaeilzadeh | G06N 3/047 |
| | | | | 706/15 |
| 2023/0389051 | A1* | 11/2023 | Leon Calvo | H04W 72/25 |
| 2023/0403730 | A1* | 12/2023 | Shen | H04W 72/25 |
| 2024/0224301 | A1* | 7/2024 | Kim | H04L 1/1812 |
| 2025/0106876 | A1* | 3/2025 | Hayashi | H04W 72/20 |

OTHER PUBLICATIONS

Qualcomm Incorporated: "Reliability and Latency Enhancements for Mode 2", 3GPP Draft, R1-2101486, 3GPP TSG RAN WG1 Meeting #104-e , 3rd Generation Partnership Project (3GPP), Mobile Competence Centre, 650, Route Des Lucioles, F-06921 Sophia-Antipolis Cedex, France, vol. RAN WG1. No. Jan. 25, 2021-Feb. 5, 2021, Jan. 19, 2021 (Jan. 19, 2021), XP051971651, 23 Pages, the whole document, sections 1-3.
Intel Corporation: "Summary#2 for AI 7.2.4.2.2 Mode-2 Resource Allocation", 3GPP TSG RAN WG1 Meeting #98, R1-1909785—Summary#2 OF 5G V2X Mode 2 V1, 3rd Generation Partnership Project, Mobile Competence Centre, 650, Route Des Lucioles, F-06921 Sophia-Antipolis Cedex, France, vol. RAN WG1, No. Prague, Czech Republic, 34 Pages, Aug. 26, 2019-Aug. 30, 2019, Sep. 3, 2019, XP051766377, the whole document.
Nokia, et al., "NR Sidelink Resource Allocation for V2X Communications", 3GPP TSG-RAN WG2 Meeting #104, R2-1817680, 3rd Generation Partnership Project, Mobile Competence Centre, 650, Route Des Lucioles, F-06921 Sophia-Antipolis, vol. RAN WG2, No. Spokane, USA, Nov. 12, 2018-Nov. 16, 2018, 3 Pages, Nov. 12, 2018, XP051557204, the whole document.
Supplementary European Search Report—EP21951326—Search Authority—Munich—Mar. 11, 2025.

* cited by examiner 115-g                    115-h                    115-i

Figure 5:
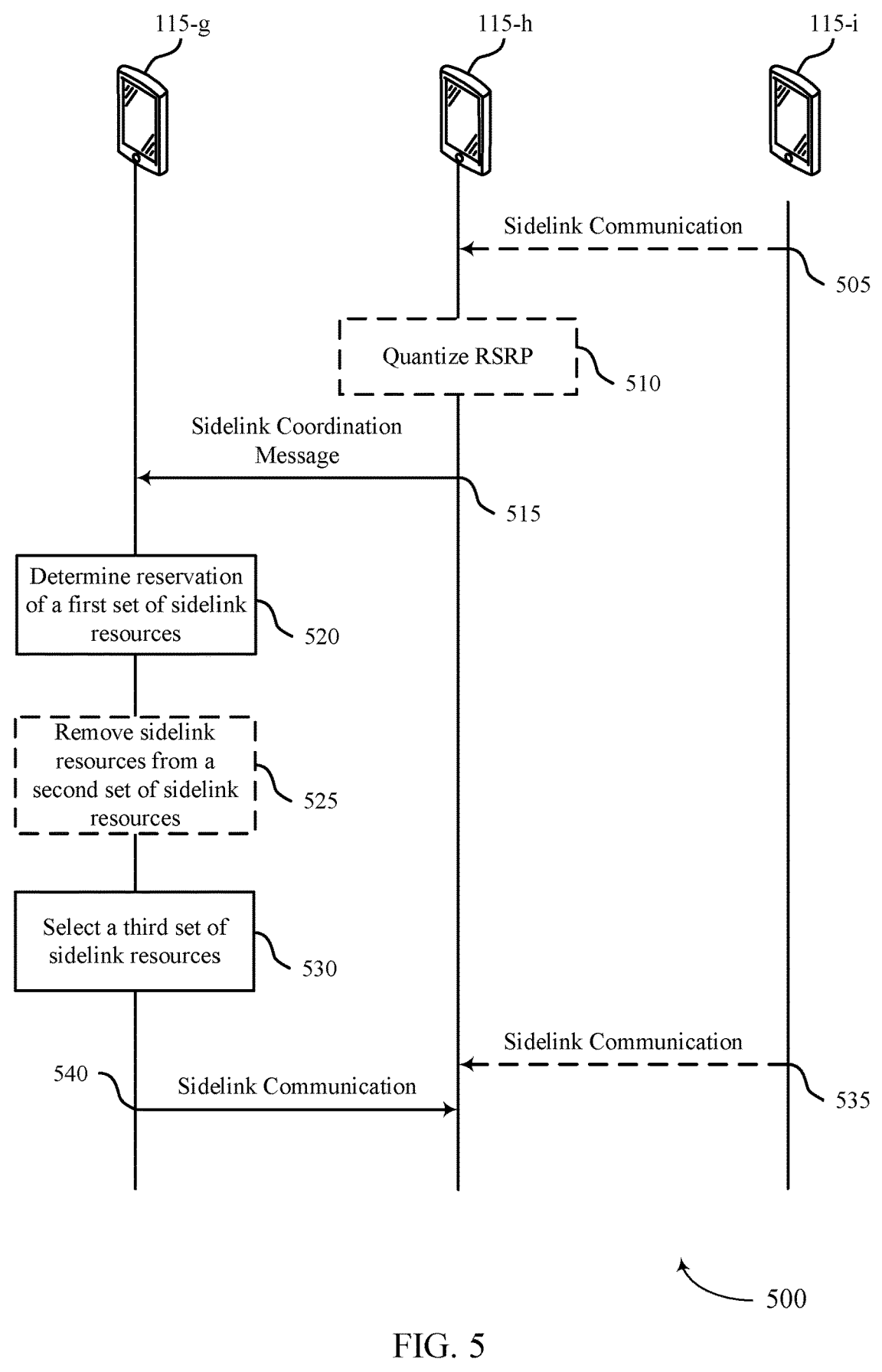

Sidelink Communication

505

Quantize RSRP          510

Sidelink Coordination
Message

515

Determine reservation
of a first set of sidelink
resources
520

Remove sidelink
resources from a
second set of sidelink
resources          525

Select a third set of
sidelink resources          530

Sidelink Communication

535

540          Sidelink Communication

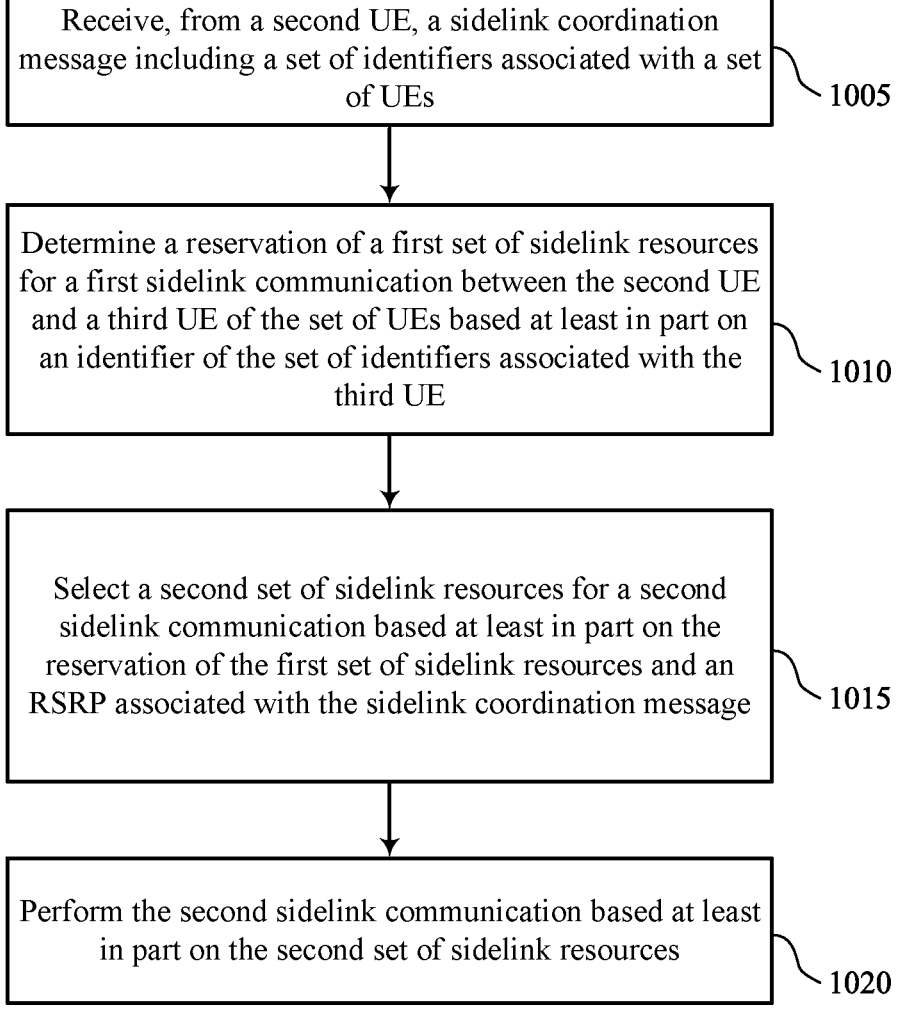

Receive, from a second UE, a sidelink coordination message including a set of identifiers associated with a set of UEs    ⌐ 1005

Determine a reservation of a first set of sidelink resources for a first sidelink communication between the second UE and a third UE of the set of UEs based at least in part on an identifier of the set of identifiers associated with the third UE    ⌐ 1010

Select a second set of sidelink resources for a second sidelink communication based at least in part on the reservation of the first set of sidelink resources and an RSRP associated with the sidelink coordination message    ⌐ 1015

Perform the second sidelink communication based at least in part on the second set of sidelink resources    ⌐ 1020

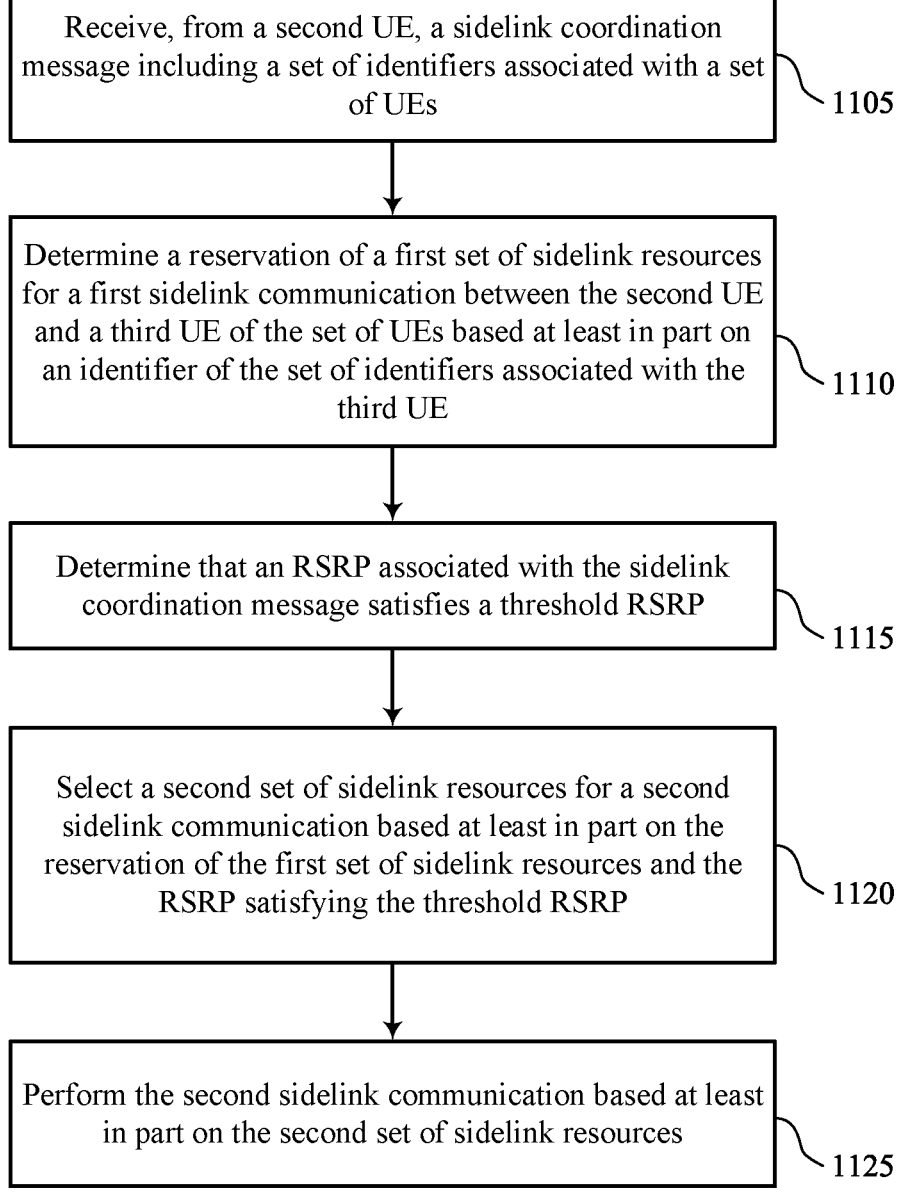

Receive, from a second UE, a sidelink coordination message including a set of identifiers associated with a set of UEs ⎰ 1105

Determine a reservation of a first set of sidelink resources for a first sidelink communication between the second UE and a third UE of the set of UEs based at least in part on an identifier of the set of identifiers associated with the third UE ⎰ 1110

Determine that an RSRP associated with the sidelink coordination message satisfies a threshold RSRP ⎰ 1115

Select a second set of sidelink resources for a second sidelink communication based at least in part on the reservation of the first set of sidelink resources and the RSRP satisfying the threshold RSRP ⎰ 1120

Perform the second sidelink communication based at least in part on the second set of sidelink resources ⎰ 1125

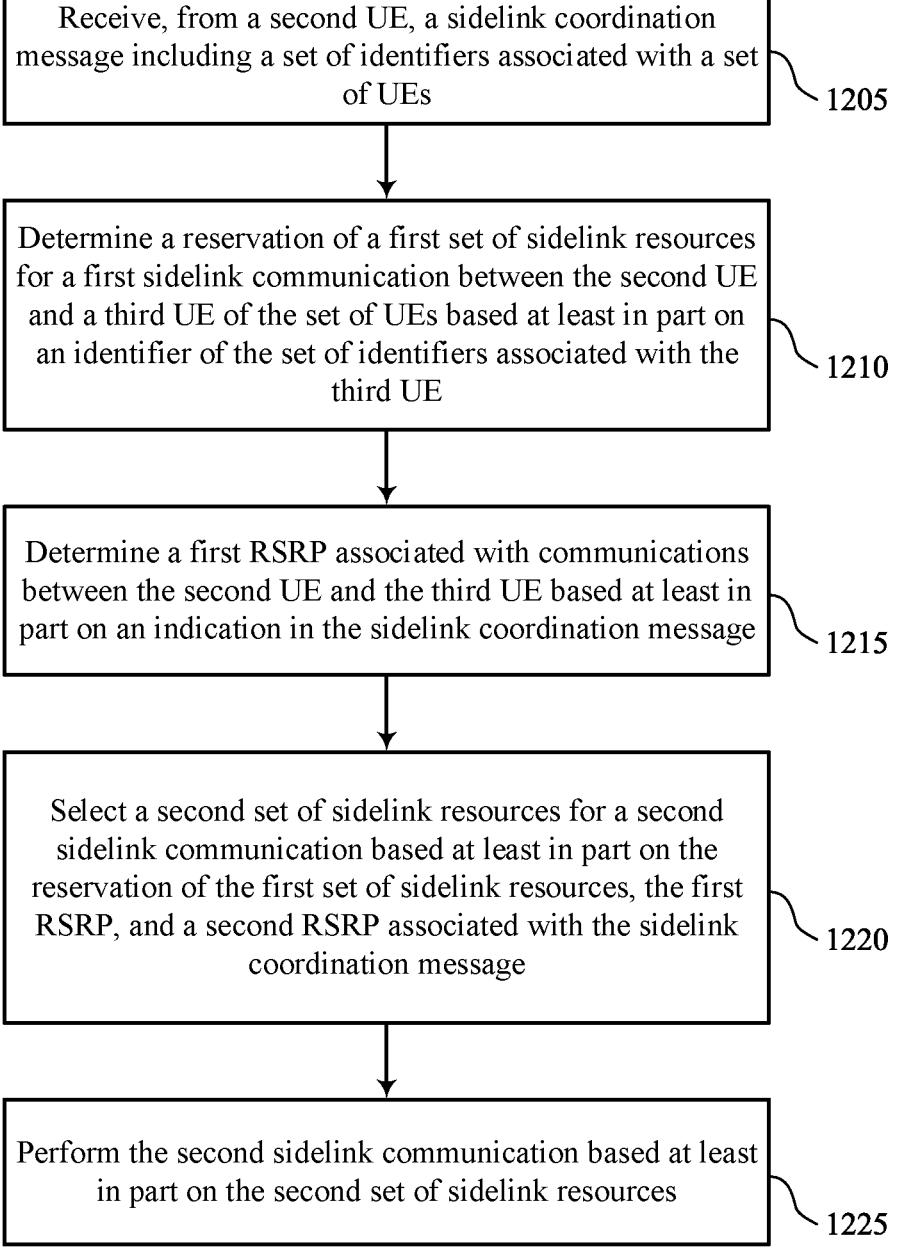

Receive, from a second UE, a sidelink coordination message including a set of identifiers associated with a set of UEs ⟍ 1205

Determine a reservation of a first set of sidelink resources for a first sidelink communication between the second UE and a third UE of the set of UEs based at least in part on an identifier of the set of identifiers associated with the third UE ⟍ 1210

Determine a first RSRP associated with communications between the second UE and the third UE based at least in part on an indication in the sidelink coordination message ⟍ 1215

Select a second set of sidelink resources for a second sidelink communication based at least in part on the reservation of the first set of sidelink resources, the first RSRP, and a second RSRP associated with the sidelink coordination message ⟍ 1220

Perform the second sidelink communication based at least in part on the second set of sidelink resources ⟍ 1225

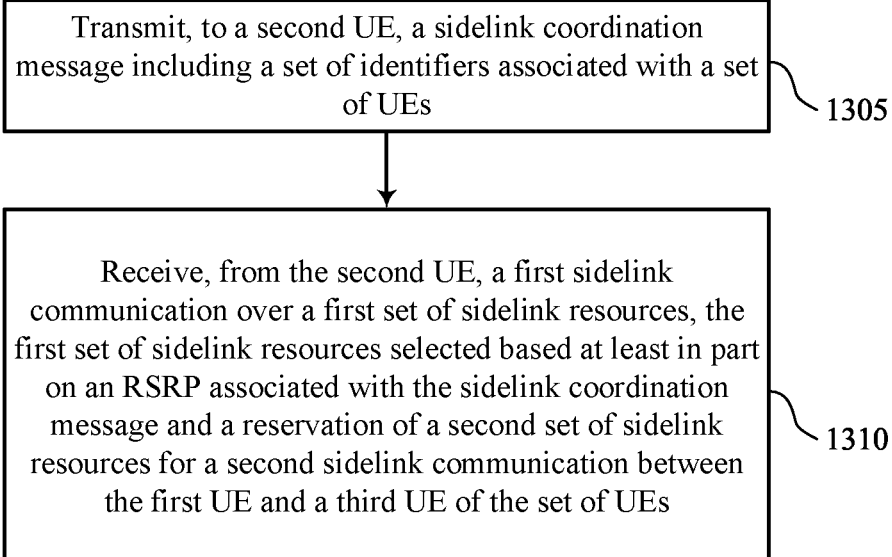

Transmit, to a second UE, a sidelink coordination message including a set of identifiers associated with a set of UEs 1305

Receive, from the second UE, a first sidelink communication over a first set of sidelink resources, the first set of sidelink resources selected based at least in part on an RSRP associated with the sidelink coordination message and a reservation of a second set of sidelink resources for a second sidelink communication between the first UE and a third UE of the set of UEs 1310

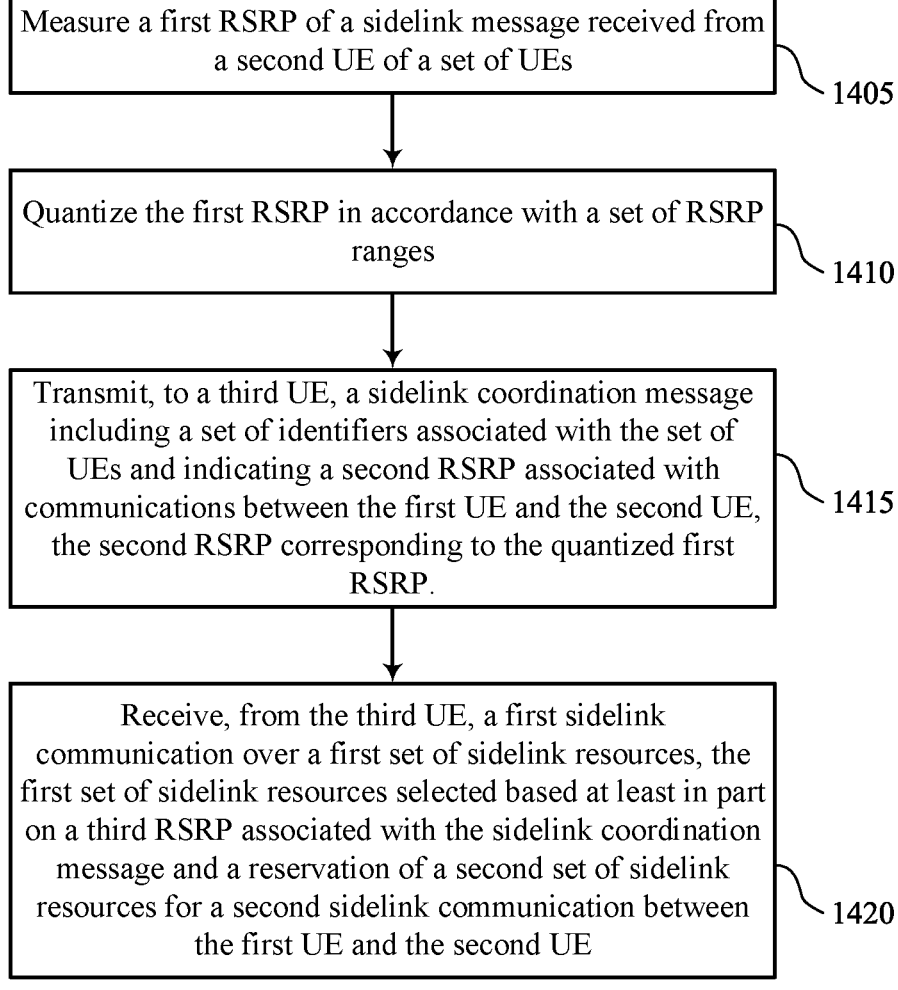

Measure a first RSRP of a sidelink message received from a second UE of a set of UEs

1405

Quantize the first RSRP in accordance with a set of RSRP ranges

1410

Transmit, to a third UE, a sidelink coordination message including a set of identifiers associated with the set of UEs and indicating a second RSRP associated with communications between the first UE and the second UE, the second RSRP corresponding to the quantized first RSRP.

1415

Receive, from the third UE, a first sidelink communication over a first set of sidelink resources, the first set of sidelink resources selected based at least in part on a third RSRP associated with the sidelink coordination message and a reservation of a second set of sidelink resources for a second sidelink communication between the first UE and the second UE

TECHNIQUES FOR MANAGING IN-BAND WIRELESS COMMUNICATION BY USER EQUIPMENT COORDINATION

CROSS REFERENCE

The present application is a 371 national stage filing of International PCT Application No. PCT/CN2021/109493 by NGUYEN et al. entitled "TECHNIQUES FOR MANAGING IN-BAND WIRELESS COMMUNICATION BY USER EQUIPMENT COORDINATION," filed Jul. 30, 2021, which is assigned to the assignee hereof, and which is expressly incorporated by reference in its entirety herein.

FIELD OF TECHNOLOGY

The following relates to wireless communications, including techniques for managing in-band wireless communication by user equipment (UE) coordination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless communications system may include one or more base stations or one or more network access nodes, each simultaneously supporting communication for multiple communication devices, which may be otherwise known as UE. In some cases, the wireless communications system may support sidelink communications between multiple communication devices, such as UEs. A UE may receive sidelink messages from multiple UEs over a same slot in a time domain and different sidelink resources in a frequency domain. In some cases, a transmission power of a sidelink message transmitted at a first frequency may leak into other frequencies, thereby interfering with the sidelink messages transmitted at the other frequencies. As a result, the sidelink messages received at the UE over the same slot may suffer reduced reliability.

SUMMARY

Various aspects of the present disclosure relate to manage sidelink resource reservation by exchanging sidelink coordination messages to indicate potential in-band emission (IBE). A UE may measure a reference signal received power (RSRP) between the UE and each UE of a set of UEs. The RSRP between the UE and a respective UE of the set of UEs may indicate the IBE interference experienced at the UE and caused by a sidelink transmission from the respective UE. To increase sidelink reliability, the UE may transmit a sidelink coordination message to another UE that includes a set of identifiers associated with the set of UEs and, in some examples, includes the measured RSRPs (e.g., quantized values of the measured RSRPs) between the UE and the set of UEs. In response to the sidelink coordination message, the other UE may select sidelink resources for sidelink communications with the UE based on an RSRP of the sidelink coordination message and reservations of sidelink resources for sidelink communications with the UE. For example, the other UE may measure the RSRP of the sidelink coordination message and may determine a reservation of a set of sidelink resources for a sidelink communication between the UE and an additional UE of the set of UEs based on an identifier of the additional UE (e.g., included in the reservation).

Based on the RSRP of the sidelink coordination message, the other UE may determine whether transmitting a sidelink message to the UE over sidelink resources that overlap in a time domain with the set of sidelink resources will cause or suffer from IBE interference. For example, if the RSRP of the sidelink coordination message (e.g., a ratio or a difference between the RSRP of the sidelink coordination message and an RSRP between the UE and the additional UE) satisfies a threshold, the other UE may determine that the sidelink message will cause or suffer from IBE interference (e.g., such that the UE may be unable to properly receive the sidelink message). Based on the determination, the other UE may select a set of sidelink resources (e.g., that are non-overlapping in the time domain with the first set of sidelink resources) for the sidelink message and may transmit the sidelink message to the UE (e.g., or to a different UE) over the set of sidelink resources.

A method for wireless communication at a first UE is described. The method may include receiving, from a second UE, a sidelink coordination message including a set of identifiers associated with a set of UEs, determining a reservation of a first set of sidelink resources for a first sidelink communication between the second UE and a third UE of the set of UEs based on an identifier of the set of identifiers associated with the third UE, selecting a second set of sidelink resources for a second sidelink communication based on the reservation of the first set of sidelink resources and an RSRP associated with the sidelink coordination message, and performing the second sidelink communication based on the second set of sidelink resources.

An apparatus for wireless communication at a first UE is described. The apparatus may include a processor, memory coupled with the processor, and instructions stored in the memory. The instructions may be executable by the processor to cause the apparatus to receive, from a second UE, a sidelink coordination message including a set of identifiers associated with a set of UEs, determine a reservation of a first set of sidelink resources for a first sidelink communication between the second UE and a third UE of the set of UEs based on an identifier of the set of identifiers associated with the third UE, select a second set of sidelink resources for a second sidelink communication based on the reservation of the first set of sidelink resources and an RSRP associated with the sidelink coordination message, and perform the second sidelink communication based on the second set of sidelink resources.

Another apparatus for wireless communication at a first UE is described. The apparatus may include means for receiving, from a second UE, a sidelink coordination message including a set of identifiers associated with a set of UEs, means for determining a reservation of a first set of sidelink resources for a first sidelink communication between the second UE and a third UE of the set of UEs based on an identifier of the set of identifiers associated with the third UE, means for selecting a second set of sidelink resources for a second sidelink communication based on the reservation of the first set of sidelink resources and an RSRP associated with the sidelink coordination message, and means for performing the second sidelink communication based on the second set of sidelink resources.

A non-transitory computer-readable medium storing code for wireless communication at a first UE is described. The code may include instructions executable by a processor to receive, from a second UE, a sidelink coordination message including a set of identifiers associated with a set of UEs, determine a reservation of a first set of sidelink resources for a first sidelink communication between the second UE and a third UE of the set of UEs based on an identifier of the set of identifiers associated with the third UE, select a second set of sidelink resources for a second sidelink communication based on the reservation of the first set of sidelink resources and an RSRP associated with the sidelink coordination message, and perform the second sidelink communication based on the second set of sidelink resources.

Some examples of the method, apparatuses, and non-transitory computer-readable medium described herein may further include operations, features, means, or instructions for determining that the RSRP associated with the sidelink coordination message satisfies a threshold RSRP, where selecting the second set of sidelink resources may be based on the RSRP associated with the sidelink coordination message satisfying the threshold RSRP.

Some examples of the method, apparatuses, and non-transitory computer-readable medium described herein may further include operations, features, means, or instructions for determining a second RSRP associated with communications between the second UE and the third UE based on an indication in the sidelink coordination message, where selecting the second set of sidelink resources may be based on the second RSRP.

Some examples of the method, apparatuses, and non-transitory computer-readable medium described herein may further include operations, features, means, or instructions for determining that a ratio of the RSRP associated with the sidelink coordination message and the second RSRP satisfies a threshold ratio, where selecting the second set of sidelink resources may be based on the ratio of the RSRP associated with the sidelink coordination message and the second RSRP satisfying the threshold ratio.

Some examples of the method, apparatuses, and non-transitory computer-readable medium described herein may further include operations, features, means, or instructions for determining that a difference between the RSRP associated with the sidelink coordination message and the second RSRP satisfies a threshold difference, where selecting the second set of sidelink resources may be based on the difference between the RSRP associated with the sidelink coordination message and the second RSRP satisfying the threshold difference.

Some examples of the method, apparatuses, and non-transitory computer-readable medium described herein may further include operations, features, means, or instructions for decoding SCI including the identifier associated with the third UE, where determining the reservation of the first set of sidelink resources may be based on decoding the SCI.

Some examples of the method, apparatuses, and non-transitory computer-readable medium described herein may further include operations, features, means, or instructions for receiving a second sidelink coordination message including the identifier associated with the third UE and indicating the first set of sidelink resources, where determining the reservation of the first set of sidelink resources may be based on receiving the second sidelink coordination message.

Some examples of the method, apparatuses, and non-transitory computer-readable medium described herein may further include operations, features, means, or instructions for removing, from a set of candidate sidelink resources including the first set of sidelink resources and the second set of sidelink resources, sidelink resources associated with one or more slots based on the reservation of the first set of sidelink resources and the RSRP associated with the sidelink coordination message, the first set of sidelink resources corresponding to the one or more slots, where selecting the second set of sidelink resources may be based on removing the sidelink resources from the set of candidate sidelink resources.

Some examples of the method, apparatuses, and non-transitory computer-readable medium described herein may further include operations, features, means, or instructions for removing, from a third set of sidelink resources including the first set of sidelink resources and the second set of sidelink resources, sidelink resources associated with one or more slots based on the reservation of the first set of sidelink resources and the RSRP associated with the sidelink coordination message, the first set of sidelink resources corresponding to the one or more slots and reporting the third set of sidelink resources to a medium access control (MAC) layer associated with the first UE, where selecting the second set of sidelink resources may be based on reporting the third set of sidelink resources.

Some examples of the method, apparatuses, and non-transitory computer-readable medium described herein may further include operations, features, means, or instructions for refraining from selecting sidelink resources in a first set of slots associated with the first set of sidelink resources for the second sidelink communication based on the RSRP associated with the sidelink coordination message, where the second set of sidelink resources may be associated with a second set of slots different from the first set of slots.

In some examples of the method, apparatuses, and non-transitory computer-readable medium described herein, selecting the second set of sidelink resources may include operations, features, means, or instructions for selecting the second set of sidelink resources in a first slot that may be non-overlapping in a time domain with a second slot associated with the first set of sidelink resources.

Some examples of the method, apparatuses, and non-transitory computer-readable medium described herein may further include operations, features, means, or instructions for measuring the RSRP associated with the sidelink coordination message based on receiving the sidelink coordination message and normalizing the RSRP based on a quantity of subchannels associated with sidelink communications between the first UE and the second UE, where selecting the second set of sidelink resources may be based on the normalized RSRP.

Some examples of the method, apparatuses, and non-transitory computer-readable medium described herein may further include operations, features, means, or instructions for determining the reservation of the first set of sidelink resources based on receiving a broadcast message that includes the identifier associated with the third UE, receiving a groupcast message that includes the identifier associated with the third UE, a distance associated with the groupcast message, or a combination thereof.

In some examples of the method, apparatuses, and non-transitory computer-readable medium described herein, the set of identifiers includes identifiers associated with UEs from which the second UE receives sidelink messages.

In some examples of the method, apparatuses, and non-transitory computer-readable medium described herein, the set of identifiers includes identifiers associated with UEs for which a second RSRP between the second UE and a respective UE satisfies a threshold RSRP.

A method for wireless communication at a first UE is described. The method may include transmitting, to a second UE, a sidelink coordination message including a set of identifiers associated with a set of UEs and receiving, from the second UE, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs.

An apparatus for wireless communication at a first UE is described. The apparatus may include a processor, memory coupled with the processor, and instructions stored in the memory. The instructions may be executable by the processor to cause the apparatus to transmit, to a second UE, a sidelink coordination message including a set of identifiers associated with a set of UEs and receive, from the second UE, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs.

Another apparatus for wireless communication at a first UE is described. The apparatus may include means for transmitting, to a second UE, a sidelink coordination message including a set of identifiers associated with a set of UEs and means for receiving, from the second UE, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs.

A non-transitory computer-readable medium storing code for wireless communication at a first UE is described. The code may include instructions executable by a processor to transmit, to a second UE, a sidelink coordination message including a set of identifiers associated with a set of UEs and receive, from the second UE, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs.

In some examples of the method, apparatuses, and non-transitory computer-readable medium described herein, the sidelink coordination message indicates a second RSRP associated with communications between the first UE and the third UE.

Some examples of the method, apparatuses, and non-transitory computer-readable medium described herein may further include operations, features, means, or instructions for measuring a third RSRP of a sidelink message received from the third UE and quantizing the third RSRP in accordance with a set of RSRP ranges, where the second RSRP corresponds to the quantized third RSRP.

Some examples of the method, apparatuses, and non-transitory computer-readable medium described herein may further include operations, features, means, or instructions for receiving a configuration message that indicates the set of RSRP ranges.

In some examples of the method, apparatuses, and non-transitory computer-readable medium described herein, a first RSRP range of the set of RSRP ranges may be associated with a first step size different from a second step size associated with a second RSRP range of the set of RSRP ranges.

Some examples of the method, apparatuses, and non-transitory computer-readable medium described herein may further include operations, features, means, or instructions for receiving the first sidelink communication over the first set of sidelink resources may be based on a ratio of the RSRP and the second RSRP satisfying a threshold ratio.

Some examples of the method, apparatuses, and non-transitory computer-readable medium described herein may further include operations, features, means, or instructions for receiving the first sidelink communication over the first set of sidelink resources may be based on a difference between the RSRP and the second RSRP satisfying a threshold difference.

Some examples of the method, apparatuses, and non-transitory computer-readable medium described herein may further include operations, features, means, or instructions for receiving the first sidelink communication over the first set of sidelink resources may be based on the RSRP satisfying a threshold RSRP.

Some examples of the method, apparatuses, and non-transitory computer-readable medium described herein may further include operations, features, means, or instructions for transmitting, to the second UE, a second sidelink coordination message including an identifier of the set of identifiers associated with the third UE and indicating the second set of sidelink resources, where receiving the first sidelink communication over the first set of sidelink resources may be based on transmitting the second sidelink coordination message.

In some examples of the method, apparatuses, and non-transitory computer-readable medium described herein, the set of identifiers includes identifiers associated with UEs from which the first UE receives sidelink messages.

In some examples of the method, apparatuses, and non-transitory computer-readable medium described herein, the set of identifiers includes identifiers associated with UEs for which a second RSRP between the first UE and a respective UE satisfies a threshold RSRP.

Some examples of the method, apparatuses, and non-transitory computer-readable medium described herein may further include operations, features, means, or instructions for receiving a configuration message that indicates the threshold RSRP.

BRIEF DESCRIPTION OF THE DRAWINGS

FIG. 5 illustrates an example of a process flow that supports techniques for managing in-band wireless communication by UE coordination in accordance with aspects of the present disclosure.

FIGS. 10 through 14 show flowcharts illustrating methods that support techniques for managing in-band wireless communication by UE coordination in accordance with aspects of the present disclosure.

DETAILED DESCRIPTION

Figure 1:
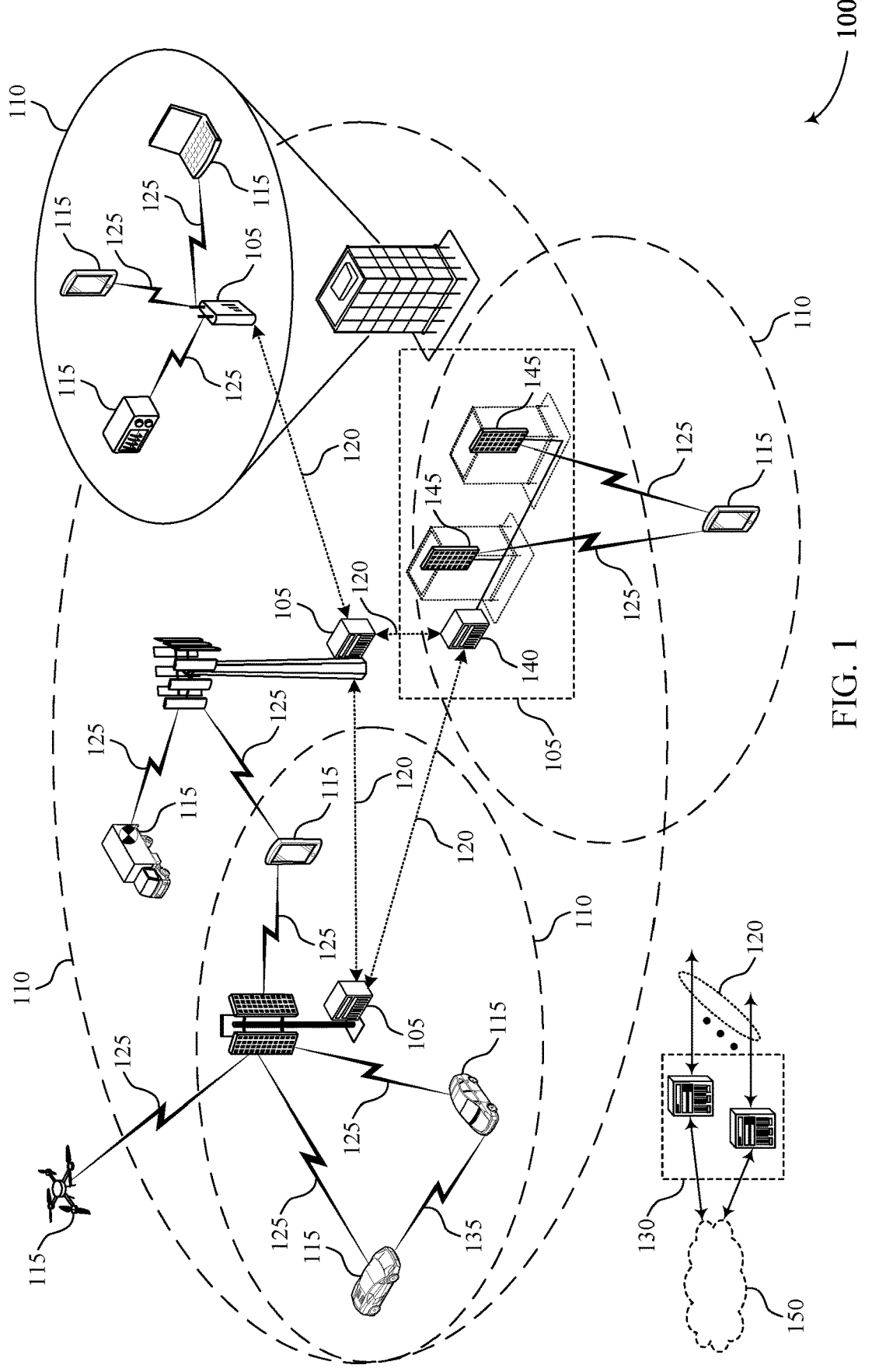
FIGS. 1 through 3 illustrate examples of wireless communications systems that support techniques for managing in-band wireless communication by UE coordination in accordance with aspects of the present disclosure.

A wireless communications system may support sidelinks for communications between communication devices. Sidelinks may refer to any communication link between similar communication devices such as UEs. It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may be reservation based. For example, a UE may monitor for and decode one or more reservation messages (e.g., sidelink control signaling, such as sidelink control information (SCI) messages) and may determine sidelink resources reserved for other sidelink communications and sidelink resources available for sidelink communications based on the reservation messages. Additionally, the UE may transmit reservation messages to reserve available sidelink resources for sidelink communications. In some examples, sidelink communications between UEs may result in IBEs, which may be images of a sidelink communication transmitted (e.g., unintentionally) at a frequency different than an allocated (e.g., intended, carrier) frequency of the sidelink communication.

IBEs may be calculated as a ratio of an output power in non-allocated resource blocks or subchannels (e.g., in one or more slots, subframes, or some other time interval) to an output power in allocated resource blocks or subchannels (e.g., in the same one or more slots, subframes, or other time interval). In some cases, sidelink communications transmitted during a same time interval (e.g., a same slot) may interfere with each other even if using difference sidelink resources in a frequency domain due to IBEs of the sidelink communications, thereby reducing a reliability of the sidelink communications. In some cases, sidelink messages may be transmitted over non-conflicting sidelink resources (e.g., in the frequency domain) yet still suffer reduced reliability caused by IBE interference.

Various aspects of the present disclosure are described herein for IBE interference coordination to improve sidelink resource reservation and selection schemes and sidelink reliability. For example, a first UE may measure an RSRP between the first UE and each UE of a set of UEs (e.g., based on a sidelink message received at the first UE from each UE of the set of UEs). The RSRP between the first UE and a UE of the set of UEs may indicate the IBE interference experienced at the first UE and caused by a sidelink transmission from the UE of the set of UEs to the first UE. To increase sidelink reliability, the first UE may transmit a sidelink coordination message to a second UE that includes a set of identifiers associated with the set of UEs and, in some examples, includes the measured RSRP(s) (e.g., quantized values of the measured RSRP(s)) between the first UE and the set of UEs.

In response to the sidelink coordination message, the second UE may select sidelink resources for sidelink communications with the first UE based on an RSRP of the sidelink coordination message and one or more reservations of sidelink resources for sidelink communications with the first UE by one or more UEs of the set of UEs. For example, the second UE may measure the RSRP of the sidelink coordination message and may determine a reservation of a first set of sidelink resources for a first sidelink communication between the first UE and a third UE of the set of UEs (e.g., a first sidelink message transmitted from the third UE to the first UE) based on an identifier of the third UE (e.g., included in the reservation).

Based on the RSRP of the sidelink coordination message, the second UE may determine whether a second sidelink communication (e.g., a second sidelink message transmitted from the second UE to the first UE or to another UE) over sidelink resources that overlap in a time domain with (e.g., during one or more same slots as) the first set of sidelink resources will cause a relatively high level of IBE interference at the first UE (e.g., such that the first sidelink communication may fail). Alternatively, the second UE may determine whether the second sidelink communication will suffer from a relatively high level of IBE interference caused by the first sidelink communication (e.g., such that the second sidelink communication may fail) based on the RSRP of the sidelink coordination message.

For example, if the RSRP of the sidelink coordination message (e.g., a ratio or a difference between the RSRP of the sidelink coordination message and an RSRP between the first UE and the third UE) satisfies a threshold RSRP, the second UE may determine that the second sidelink message will cause or suffer from the relatively high level of IBE interference. Alternatively, if a ratio or a difference between the RSRP of the sidelink coordination message and an RSRP between the first UE and the third UE) satisfies a threshold ratio or a threshold difference, respectively, the second UE may determine that the second sidelink message will cause or suffer from the relatively high level of IBE interference. Based on the IBE interference determination, the second UE may select a second set of sidelink resources (e.g., that are non-overlapping in the time domain with the first set of sidelink resources) for the second sidelink message and may transmit the second sidelink message to the first UE (e.g., or another UE) over the second set of sidelink resources.

Aspects of the subject matter described in the present disclosure may be implemented to realize one or more of the following potential improvements, among others. The techniques employed by the UEs may provide benefits and enhancements to the operation of the UEs. For example, operations performed by the UEs may provide improvements to sidelink communications. In some examples, communicating sidelink coordination messages to indicate potential IBE interference and selecting sidelink resources may improve UE sidelink resource selection procedures, thereby improving sidelink reliability, resource usage, and data rates of sidelink communications. In some other examples, communicating sidelink coordination messages to indicate potential IBE interference and selecting sidelink resources may provide improvements to latency, power consumption, coordination between devices, battery life, spectral efficiency, and processing capability among other benefits.

Aspects of the disclosure are initially described in the context of wireless communications systems. Aspects of the disclosure are additionally described in the context of a resource pool and a process flow. Aspects of the disclosure are further illustrated by and described with reference to apparatus diagrams, system diagrams, and flowcharts that relate to techniques for managing in-band wireless communication by UE coordination.

FIG. 1 illustrates an example of a wireless communications system 100 that supports techniques for managing in-band wireless communication by UE coordination in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may be an example of a sidelink network. Here, the sidelink network may support one or more resource allocation modes to coordinate sidelink communications between UEs 115 (e.g., over D2D communication links 135, over PC5 links). For example, the sidelink network may be configurable to operate according a Mode 1 resource allocation mode or a Mode 2 resource allocation mode, or both. While operating in Mode 1, the sidelink network (e.g., sidelink communications over the sidelink network) may be managed (e.g., coordinated) by a base station 105. For example, during Mode 1 operation, the base station 105 may manage sidelink resource allocation over the sidelink network.

While operating in Mode 2, the sidelink network may not be managed or coordinated by the base station 105. Without coordination or management of sidelink resources of the sidelink network during the Mode 2 operation, UEs 115 may follow contention-based access procedures in which the various UEs 115 may reserve sidelink resources of the sidelink network. For example, during Mode 2 operation, a UE 115 may monitor the sidelink network to determine if other UEs 115 are attempting to transmit over the sidelink network. For instance, the UE 115 may decode one or more reservation messages (e.g., sidelink control channel transmissions such as SCI messages, SCI-1 messages, SCI-2 messages, request-to-send-messages, or some other sidelink control channel transmissions) and may determine which sidelink resources are reserved for other sidelink communications and which sidelink resources are available for sidelink communications based on the reservation messages.

In some examples, the UE 115 may determine whether a sidelink resource is reserved based on measuring an RSRP of an associated reservation message. In some other examples, the UE 115 may determine whether a sidelink resource is reserved based on a priority level of an associated reservation message. In some cases, the UE 115 may determine which sidelink resources are available for sidelink communications based on reservation messages decoded during a sensing window, where the sensing window corresponds to some duration of time prior to the arrival of a packet of information. In some examples, the packet arrival may trigger the UE 115 to determine which sidelink resources are available and to reserve sidelink resources (e.g., via random selection of the available sidelink resources).

In some examples, UEs 115 may be configured with one or more sidelink resource pools from which to select and reserve sidelink resources (e.g., during Mode 2 operation). In some cases, sidelink resource pools may include transmit sidelink resource pools (e.g., sets of sidelink resources over which the UE 115 may transmit sidelink messages) and receive sidelink resource pools (e.g., sets of sidelink resources over which the UE 115 may receive sidelink messages). The sidelink resource pools may be configured for Mode 1 communications or for Mode 2 communications. In some examples, a sidelink resource pool configuration for a sidelink resource pool may include a physical sidelink shared channel (PSSCH) configuration, a physical sidelink control channel (PSCCH) configuration, physical sidelink feedback channel (PSFCH) configuration, a quantity of subchannels in the sidelink resource pool, a subchannel size, a starting resource block of the sidelink resource pool, a modulation and coding scheme (MCS) associated with the sidelink resource pool, a sensing configuration, a power control configuration, a constant bit rate (CBR), or a combination thereof.

Various aspects of the present disclosure support IBE interference coordination techniques to improve sidelink resource reservation and selections schemes (e.g., during Mode 2 operation) and sidelink reliability, among other benefits. For example, a first UE 115 may transmit a sidelink coordination message to a second UE 115 that includes a set of identifiers associated with a set of UEs 115. In some examples, the sidelink coordination message may further include an RSRP between the first UE 115 and one or more UEs 115 of the set of UEs 115. The second UE 115 may measure an RSRP of the sidelink coordination message and may select sidelink resources for communicating with the first UE 115 (e.g., or another UE 115) based on the RSRP of sidelink coordination message to avoid causing or suffering from IBE interference associated with communications between the first UE 115 and one or more UEs 115 of the set of UEs 115.

The second UE 115 may determine a reservation of a first set of sidelink resources for a first sidelink communication between the first UE 115 and a third UE 115 of the set of UEs 115. The second UE 115 may determine whether transmitting a sidelink message to the first UE 115 (e.g., or to another UE 115) using sidelink resources that at least partially overlap in a time domain with the first set of sidelink resources will cause or suffer from a threshold level of IBE interference (e.g., based on whether the RSRP of the sidelink coordination message satisfies a threshold, based on whether a ratio or a difference between the RSRP of the sidelink coordination message and an RSRP between the first UE 115 and the third UE 115 satisfies a threshold) and may select sidelink resources for the sidelink message based on the determination.

For example, if the threshold level of IBE interference fails to be satisfied, the second UE 115 may select a second set of sidelink resources for transmitting the sidelink message that may at least partially overlap in the time domain with the first set of sidelink resources. Alternatively, if the threshold level of IBE interference is satisfied, the second UE 115 may select a third set of sidelink resource for transmitting the sidelink message that are non-overlapping in the time domain with the first set of sidelink resources. The second UE 115 may then transmit the sidelink message to the first UE 115 (e.g., or to another UE 115) using the second set of sidelink resources or the third set of sidelink resources.

Figure 2:
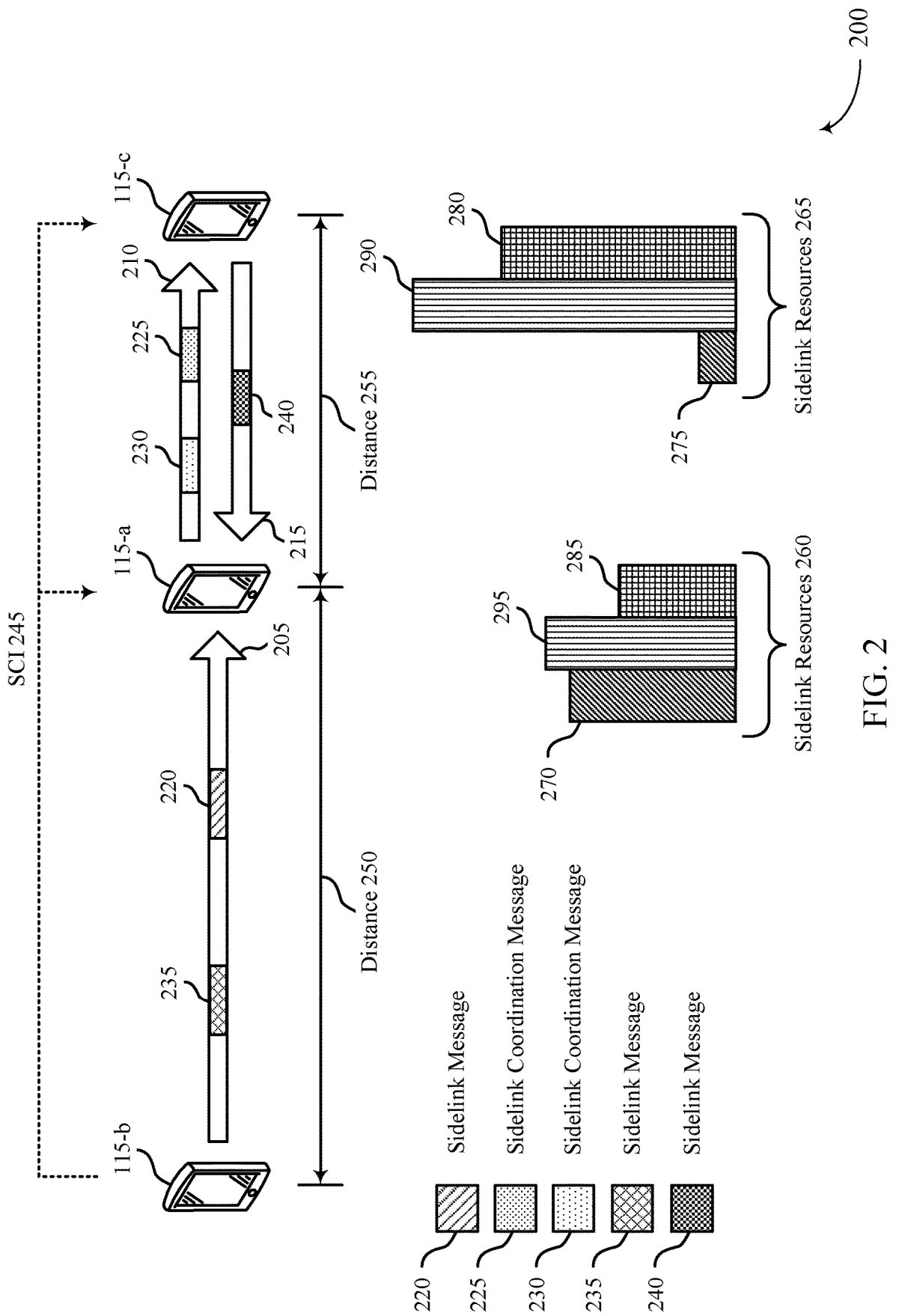

FIG. 2 illustrates an example of a wireless communications system 200 that supports techniques for managing in-band wireless communication by UE coordination in accordance with aspects of the present disclosure. The wireless communications system 200 may implement aspects of the wireless communications system 100 or may be implemented by aspects of the wireless communications system 100. For example, the wireless communications system 200 may include a UE 115-a, a UE 115-b, and a UE 115-c which may be examples of a UE 115 described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support IBE interference coordination to support improvements to reliability, sidelink resource selection and reservation, resource usage, data rates, spectral efficiency, latency, coordination between devices, power consumption, battery life, and processing capability among other benefits.

The wireless communications system 200 may support sidelink communications between the UE 115-a and the UE 115-b, and between the UE 115-a and the UE 115-c. For example, the UE 115-b may transmit and the UE 115-a may receive sidelink communications over a sidelink 205. Additionally, the UE 115-a may transmit and the UE 115-c may receive sidelink communications over a sidelink 210, and the UE 115-*c* may transmit and the UE 115-*a* may receive sidelink communications over a sidelink 215. In some cases, the sidelinks 205, 210, and 215 may be respective examples of D2D communication links 135 as described with reference to FIG. 1.

The UEs 115 may be located at various distances with respect to one another. For example, the UE 115-*a* and the UE 115-*b* may be separated by a distance 250, and the UE 115-*a* and the UE 115-*b* may be separated by a distance 255. In the example of FIG. 2, the distance 250 may be larger than the distance 255. In some examples, a strength of signals communicated between the UEs 115 may be based on the distance between respective UEs 115. For example, larger distances between UEs 115 may result in relatively weaker signals and smaller RSRPs compared to signals communicated between UEs 115 separated by smaller distances. In the example of FIG. 2, signals communicated between the UE 115-*a* and the UE 115-*c* may be relatively stronger and have relatively higher RSRPs than signals communicated between the UE 115-*a* and the UE 115-*b*.

The wireless communications system 200 may be configured to operate according to a Mode 2 resource allocation mode. For example, the UEs 115 may monitor respective sidelinks 205, 210, and 215 for SCI 245 (e.g., during a sensing window) in order to determine which sidelink resources are available and which sidelink resources are reserved (e.g., unavailable). For instance, a UE 115 may transmit SCI 245 to one or more UEs 115 to reserve one or more available sidelink resources. Other UEs 115 may receive and decode the SCI 245 to determine which sidelink resources are reserved by the SCI 245 (e.g., and by the UE 115). In some cases, the sidelink resources reserved by SCI 245 may be randomly selected from a set of available sidelink resources by the UE 115 that transmits the SCI 245. For example, a UE 115 may determine which sidelink resources are available based on SCI 245 decoded by the UE 115 during a sensing window and may randomly select one or more of the available sidelink resources to reserve, via SCI 245, for transmission of one or more sidelink communications.

In some cases, however, sidelink communications transmitted using available sidelink resources may suffer reduced reliability caused by IBE interference. For example, the UE 115-*b* may transmit a first sidelink communication to the UE 115-*a* over sidelink resources 260 and the UE 115-*c* may transmit a second sidelink communication to the UE 115-*a* over sidelink resources 265. In this example, the sidelink resources 260 and the sidelink resources 265 may overlap in a time domain (e.g., occupy one or more same slots) and may be non-overlapping in a frequency domain, and thus may be non-conflicting sidelink resources. However, each of the first sidelink communication and the second sidelink communication may cause IBE interference. For instance, the IBE interference caused in non-allocated frequency resources may be a function of the received power of a signal in allocated frequency resources. Thus, as the received power of a signal increases, the level of IBE interference caused by the signal also increases.

In the example of FIG. 2, the UE 115-*a* may measure an RSRP 270 of the first sidelink communication transmitted by the UE 115-*b* over the sidelink resources 260, where the RSRP of a sidelink communication may correspond to a measurement of a received power of the sidelink communication. In a first example, the UE 115-*a* may measure an RSRP 280 of the second sidelink communication transmitted by the UE 115-*b* over the sidelink resources 265, which may be larger than the RSRP 270 (e.g., due to the distance

255 being less than the distance 250). The first sidelink communication may cause IBE interference 275 in the sidelink resources 265 and the second sidelink communication may cause IBE interference 285 in the sidelink resources 260, which may be larger than the IBE interference 275 based on the RSRP 280 being larger than the RSRP 270. Here, the UE 115-*a* may be able to properly decode the first sidelink communication and the second sidelink communication as the both the RSRP 270 and the RSRP 280 are larger than the IBE interference 285 and the IBE interference 295, respectively, however, the first sidelink communication may suffer from increased noise and reduced reliability (e.g., increased bit error rate) due to the relatively high level of IBE interference 285.

In some examples, the UE 115-*a* may measure an RSRP 290 of the second sidelink communication. In this example, the distance 255 may be reduced further and thus the RSRP (e.g., the RSRP) from the UE 115-*c* to the UE 115-*a* may further increase. Here, the second sidelink communication may cause IBE interference 295 in sidelink resources 260, which may be greater than the RSRP 270. As a result, the UE 115-*a* may be unable to properly decode the first sidelink communication despite receiving the first sidelink communication and the second sidelink communication over non-conflicting resources.

In order to increase sidelink communication reliability and sidelink resource selection robustness, the UE 115-*a*, the UE 115-*b*, and the UE 115-*c* may be configured to perform IBE interference coordination techniques to reduce or mitigate the effects of IBE interference. For example, the UE 115-*a* may transmit a sidelink coordination message 225 to the UE 115-*c* (e.g., and one or more other UEs 115) that includes an identifier associated with the UE 115-*b* (e.g., and identifiers associated with any other UEs 115 from which the UE 115-*a* receives sidelink communications). If the UE 115-*c* detects a reservation for sidelink resources by the UE 115-*b* (e.g., based on the identifier associated with the UE 115-*b*), the UE 115-*c* may avoid selecting sidelink resources that overlap in the time domain with the reserved sidelink resources. In some examples, the UE 115-*c* may select the sidelink resources based on a level of IBE interference caused by the UE 115-*c* transmissions. For example, in some cases, the UE 115-*c* may select sidelink resources that overlap in the time domain with the reserved sidelink resources if the IBE interference is less than the RSRP 270 (e.g., IBE interference 285), but may refrain from selecting time overlapping sidelink resources if the IBE interference is greater than the RSRP 270 (e.g., IBE interference 295).

To support transmission of the sidelink coordination message 225, the UE 115-*a* may receive a sidelink message 220 from the UE 115-*b* and may measure an RSRP of the sidelink message 220. The RSRP of the sidelink message 220 may indicate whether sidelink communications transmitted by the UE 115-*b* to the UE 115-*a* are vulnerable to IBE interference. For example, the smaller the RSRP of the sidelink message 220 (e.g., the greater the distance 250), the more vulnerable that the sidelink communications are to IBE interference. In some examples, the sidelink message 220 may be an example of SCI 245 that reserves sidelink resources for transmission of one or more sidelink communications by the UE 115-*b* (e.g., to the UE 115-*a*, to the UE 115-*c*, to other UEs 115). In some other examples, the sidelink message may be an example of a sidelink coordination message, a sidelink data message, a sidelink feedback message, sidelink control signaling, or some other type of sidelink message (e.g., using sidelink resources previously reserved by SCI 245 transmitted by the UE 115-*b*). In some examples, the UE 115-*a* may transmit the sidelink coordination message 225 via sidelink control signaling (e.g., SCI 245), a MAC-control element (MAC-CE), RRC signaling, or a combination thereof.

The UE 115-*a* may include the identifier associated with the UE 115-*b* in the sidelink coordination message 225 to indicate to the UE 115-*c* that the sidelink transmissions by the UE 115-*b* may be vulnerable to relatively high levels of IBE interference at the UE 115-*a*. In some examples, the UE 115-*a* may include a set of identifiers associated with a set of UEs 115 (e.g., including the UE 115-*b*) whose sidelink transmissions may be vulnerable to relatively high levels of IBE interference at the UE 115-*a*. Additionally, the UE 115-*a* may include the RSRP of the sidelink message 220 (e.g., and respective RSRPs of the set of UEs 115) in the sidelink coordination message 225. In some examples, the UE 115-*a* may quantize the RSRP of the sidelink message 220 in accordance with a set of RSRP ranges. For example, the UE 115-*a* may determine within which RSRP range of the set of RSRP ranges the RSRP of the sidelink message 220 is located and may quantize the RSRP of the sidelink message 220 to an RSRP value corresponding to the RSRP range. In this way, the UE 115-*a* may reduce a quantity of bits used to indicate the RSRP of the sidelink message 220. In some examples, the UE 115-*a* may quantize the RSRP of the sidelink message 220 in accordance with uneven step sizes. For example, a first RSRP range of the set of RSRP ranges may have a first step size (e.g., a step size or range of 10 decibel (dB) milliwatts (dBm), or some other quantity of dBm), a second RSRP range of the set of RSRP ranges may have a second step size (e.g., a step size or range of 20 dBm, or some other quantity of dBm), a third RSRP range of the set of RSRP ranges may have a third step size (e.g., a step size or range of 30 dBm, or some other quantity of dBm), and so on. Each step size may be the same or different from other step sizes associated with the set of RSRP ranges. In some examples, the UE 115-*a* may quantize each respective RSRP of the set of UEs 115.

In some cases, the UE 115-*a* may include the identifier associated with the UE 115-*b* based on the RSRP of the sidelink message 220. For example, to reduce a quantity bits of the sidelink coordination message and to save sidelink resources, the UE 115-*a* may include, in the sidelink coordination message 225, identifiers associated with UEs 115 that have RSRPs less than (e.g., less than or equal to) a threshold RSRP T1. Here, the UE 115-*a* may omit the inclusion of RSRP information (e.g., the RSRP of the sidelink message 220, the quantized RSRP of the sidelink message 220) in the sidelink coordination message 225. The UE 115-*c* may be configured to assume that the RSRP of the UEs 115 corresponding to the identifiers included in the sidelink coordination message 225 are at least less than (e.g., less than or equal to) T1.

The UE 115-*c* may receive the sidelink coordination message 225 and may communicate with the UE 115-*a* based on the sidelink coordination message 225. For example, the UE 115-*c* may measure an RSRP of the sidelink coordination message 225. In some cases, the RSRP of the sidelink coordination message 225 may be the same as or similar to a received power of sidelink communications transmitted by the UE 115-*c* to the UE 115-*a*. The RSRP of the sidelink coordination message 225 may indicate a level of IBE interference caused by the sidelink communications transmitted the UE 115-*c* to the UE 115-*a*. Therefore, the UE 115-*c* may determine whether its transmissions will cause a relatively high level of IBE interference (e.g., IBE interference 295) and may select sidelink resources for communicating with the UE 115-*a*.

For example, the UE 115-*c* may compare a ratio of the RSRP of the sidelink coordination message 225 and the indicated (e.g., quantized) RSRP of the sidelink message 220 (e.g., the RSRP of the sidelink coordination message 225 divided by the indicated RSRP of the sidelink message 220) to a threshold ratio T2 to determine whether the ratio satisfies (e.g., is greater than, is greater than or equal to) T2. Alternatively, the UE 115-*c* may compare a difference of the RSRP of the sidelink coordination message 225 and the indicated RSRP of the sidelink message 220 (e.g., the RSRP of the sidelink coordination message 225 minus the indicated RSRP of the sidelink message 220) to a threshold difference T3 to determine whether the difference satisfies (e.g., is greater than, is greater than or equal to) T3. Alternatively, the UE 115-*c* may compare the RSRP of the sidelink coordination message 225 to a threshold RSRP T4 (e.g., if the RSRP information is omitted in the sidelink coordination message 225) to determine whether the RSRP of the sidelink coordination message 225 satisfies (e.g., is greater than, is greater than or equal to) T4. In some examples, the UE 115-*c* may normalize the RSRP of the sidelink coordination message 225 and the indicated RSRP of the sidelink message 220 in accordance with a quantity of subchannels associated with sidelink communications between the UE 115-*c* and the UE 115-*a* (e.g., based on the quantity of subchannels spanned by a resource pool). Here, the UE 115-*c* may use the normalized RSRPs in calculating (e.g., and/or comparing) the ratio, the difference, or the RSRP of sidelink coordination message 225 to T2, T3, or T4, respectively.

If the ratio, the difference, or the RSRP of the sidelink coordination message 225 satisfy T2, T3, or T4, respectively, the UE 115-*c* may determine that its transmissions will cause a relatively high level of IBE interference to transmissions of the UE 115-*b* at the UE 115-*a* and may select sidelink resources to avoid causing the IBE interference. For example, the UE 115-*c* may determine a reservation of a first set of sidelink resources for the transmission of a sidelink message 235 by the UE 115-*b* to the UE 115-*c*. In some examples, the UE 115-*c* may determine the reservation of the first set of sidelink resources by decoding SCI 245 transmitted by the UE 115-*b* that reserves the first set of sidelink resources. The UE 115-*c* may identify the identifier associated with the UE 115-*b* included in the SCI 245 and may determine that the reservation corresponds to a UE 115 indicated by the sidelink coordination message 225. In some other examples, the UE 115-*a* may receive the SCI 245 that reserves the first set of sidelink resources and may transmit a sidelink coordination message 230 to the UE 115-*c* that indicates the reservation of the first set of sidelink resources (e.g., and the identifier associated with the UE 115-*b*). In still some other examples, another UE 115 (not shown), may receive the SCI 245 that reserves the first set of sidelink resources and may transmit a sidelink coordination message to the UE 115-*c* that indicates the reservation of the first set of sidelink resources (e.g., and the identifier associated with the UE 115-*b*). In some cases, the UE 115-*c* may receive a broadcast message from a UE 115 (e.g., the UE 115-*a*, the UE 115-*b*, another UE 115) that indicates the reservation (e.g., and the identifier associated with the UE 115-*b*). In some other cases, the UE 115-*c* may receive a groupcast message from a UE 115 (e.g., the UE 115-*a*, the UE 115-*b*, another UE 115) that indicates the reservation (e.g., and the identifier associated with the UE 115-*b*). In some examples, the UE 115-*c* may determine that the reservation is valid if a distance associated with the groupcast message is within a threshold distance.

In response to determining the reservation, the UE 115-*c* may avoid selecting sidelink resources that overlap in the time domain with the first set of sidelink resources based on the IBE interference determination. For example, the UE 115-*c* may select (e.g., and reserve) a second set of sidelink resources for the transmission of a sidelink message 240 to the UE 115-*a* (e.g., or to another UE 115 (not shown)), where the second set of sidelink resources are non-overlapping in the time domain with the first set of sidelink resources (e.g., even if time overlapping sidelink resources are available). In this way, the UE 115-*c* may transmit the sidelink message 240 over the second set of sidelink resources without causing or reducing a level of IBE interference to the sidelink message 235, thereby increasing a reliability of the sidelink message 235.

Figure 3:
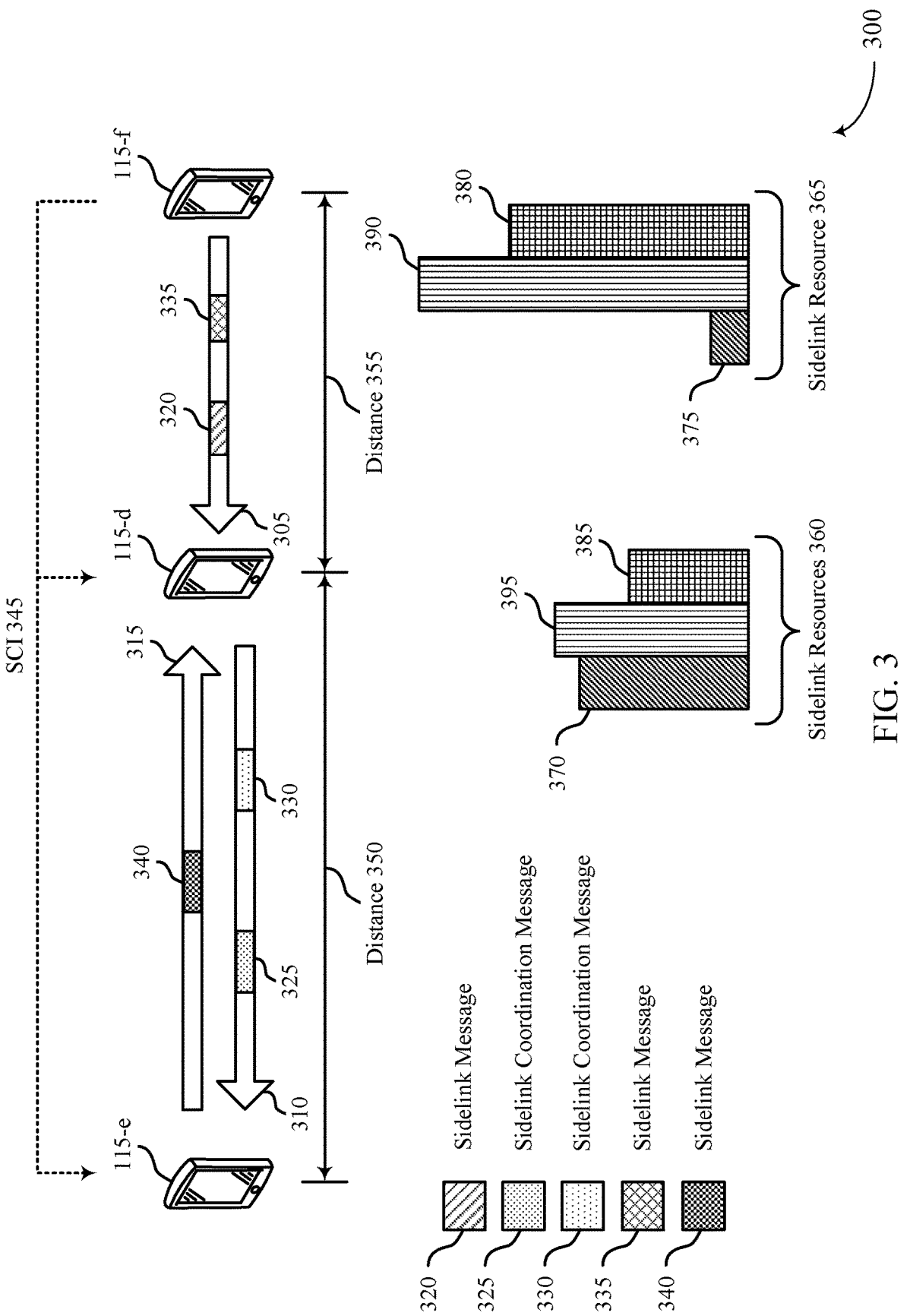

FIG. 3 illustrates an example of a wireless communications system 300 that supports techniques for managing in-band wireless communication by UE coordination in accordance with aspects of the present disclosure. The wireless communications system 300 may implement aspects of the wireless communications systems 100 and 200 or may be implemented by aspects of the wireless communications system 100 and 200. For example, the wireless communications system 300 may include a UE 115-*d*, a UE 115-*e*, and a UE 115-*f* which may be examples of a UE 115 described with reference to FIGS. 1 and 2. In some examples, the wireless communications system 300 may support multiple radio access technologies including 4G systems such as LTE systems, LTE-A systems, or LTE-A Pro systems, and 5G systems which may be referred to as NR systems. The wireless communications system 300 may support IBE interference coordination to support improvements to reliability, sidelink resource selection and reservation, resource usage, data rates, spectral efficiency, latency, coordination between devices, power consumption, battery life, and processing capability among other benefits.

The wireless communications system 300 may support sidelink communications between the UE 115-*d* and the UE 115-*e*, and between the UE 115-*d* and the UE 115-*f*. For example, the UE 115-*f* may transmit and the UE 115-*d* may receive sidelink communications over a sidelink 305. Additionally, the UE 115-*d* may transmit and the UE 115-*e* may receive sidelink communications over a sidelink 310, and the UE 115-*e* may transmit and the UE 115-*d* may receive sidelink communications over a sidelink 315. In some cases, the sidelinks 305, 310, and 315 may be respective examples of D2D communication links 135 or sidelinks 205, 210 and 215 as described with reference to FIGS. 1 and 2.

The UEs 115 may be located at various distances with respect to one another. For example, the UE 115-*d* and the UE 115-*e* may be separated by a distance 350, and the UE 115-*d* and the UE 115-*f* may be separated by a distance 355. In the example of FIG. 3, the distance 350 may be larger than the distance 355. In the example of FIG. 3, signals communicated between the UE 115-*d* and the UE 115-*f* may be relatively stronger and have relatively higher RSRPs than signals communicated between the UE 115-*d* and the UE 115-*e*.

The wireless communications system 300 may be configured to operate according to a Mode 2 resource allocation mode. For example, the UEs 115 may monitor respective sidelinks 305, 310, and 315 for SCI 345 (e.g., during a sensing window) in order to determine which sidelink resources are available and which sidelink resources are reserved (e.g., unavailable). However, as described with reference to FIG. 2, sidelink communications transmitted using available sidelink resources may suffer reduced reliability caused by IBE interference. For example, the UE 115-*e* may transmit a first sidelink communication to the UE 115-*d* over sidelink resources 360 and the UE 115-*f* may transmit a second sidelink communication to the UE 115-*d* over sidelink resources 365, which may overlap in a time domain (e.g., occupy one or more same slots) and may be non-overlapping in a frequency domain, and thus may be non-conflicting sidelink resources. However, each of the first sidelink communication and the second sidelink communication may cause IBE interference.

In the example of FIG. 3, the UE 115-*d* may measure an RSRP 370 of the first sidelink communication transmitted by the UE 115-*e* over the sidelink resources 360. In a first example, the UE 115-*d* may measure an RSRP 380 of the second sidelink communication transmitted by the UE 115-*b* over the sidelink resources 365, which may be larger than the RSRP 370 (e.g., due to the distance 355 being less than the distance 350). The first sidelink communication may cause IBE interference 375 in the sidelink resources 365 and the second sidelink communication may cause IBE interference 385 in the sidelink resources 360, which may be larger than the IBE interference 375 based on the RSRP 380 being larger than the RSRP 370. Here, the UE 115-*d* may be able to properly decode the first sidelink communication and the second sidelink communication as the both the RSRP 370 and the RSRP 380 are larger than the IBE interference 385 and the IBE interference 395, respectively, however, the first sidelink communication may suffer from increased noise and reduced reliability (e.g., increased bit error rate) due to the relatively high level of IBE interference 385.

In some examples, the UE 115-*d* may measure an RSRP 390 of the second sidelink communication. In this example, the distance 355 may be reduced further and thus the received signal power (e.g., the RSRP) from the UE 115-*f* to the UE 115-*d* may further increase. Here, the second sidelink communication may cause IBE interference 395 in sidelink resources 360, which may be greater than the RSRP 370. As a result, the UE 115-*d* may be unable to properly decode the first sidelink communication despite receiving the first sidelink communication and the second sidelink communication over non-conflicting resources.

In order to increase sidelink communication reliability and sidelink resource selection robustness, the UE 115-*d*, the UE 115-*e*, and the UE 115-*f* may be configured to perform IBE interference coordination techniques to reduce or mitigate the effects of IBE interference. For example, the UE 115-*d* may indicate to one or more UEs 115 (e.g., the UE 115-*e*) which UEs 115 (e.g., the UE 115-*f*) may cause relatively high levels of IBE interference at the UE 115-*d*. In response, if the one or more UEs 115 (e.g., the UE 115-*e*) detect a reservation of sidelink resources by the UE 115-*f*, for example, the one or more UEs 115 may avoid selecting sidelink resources that overlap in the time domain with the reserved sidelink resources in order to communicate with the UE 115-*d*. In some examples, the UE 115-*e* may select the sidelink resources based on a level of IBE interference caused by the UE 115-*f* transmissions. For example, in some cases, the UE 115-*e* may select sidelink resources that overlap in the time domain with the reserved sidelink resources if the IBE interference is less than the RSRP 370 (e.g., IBE interference 385), but may refrain from selecting time overlapping sidelink resources if the IBE interference is greater than the RSRP 370 (e.g., IBE interference 395).

To support the indication of the UEs 115 that cause relatively high levels of IBE interference, the UE 115-*d* may transmit a sidelink coordination message 325 to the one or more UEs (e.g., the UE 115-*e*). The sidelink coordination message 325 may include a set of identifiers associated with a set of UEs 115 (e.g., including the UE 115-*f*) that may cause the relatively high levels of IBE interference. The UE 115-*e* may receive the sidelink coordination message 325 and determine that the UE 115-*f* may cause relatively high levels of IBE interference at the UE 115-*d*. In some examples, the UE 115-*d* may transmit the sidelink coordination message 325 via sidelink control signaling (e.g., SCI 345), a MAC-CE, RRC signaling, or a combination thereof.

To support transmission of the sidelink coordination message 325, the UE 115-*d* may receive a sidelink message 320 from the UE 115-*f* and may measure an RSRP of the sidelink message 320. The RSRP of the sidelink message 320 may indicate whether sidelink communications transmitted by the UE 115-*f* to the UE 115-*d* will cause relatively high levels of IBE interference. For example, the greater the RSRP of the sidelink message 320 (e.g., the smaller the distance 355), the greater the level of IBE interference caused by sidelink messages from UE 115-*f* (e.g., the sidelink message 320). In some examples, the sidelink message 320 may be an example of SCI 345, a sidelink coordination message, a sidelink data message, a sidelink feedback message, sidelink control signaling, or some other type of sidelink message (e.g., using sidelink resources previously reserved by SCI 345 transmitted by the UE 115-*f*). In some examples, the UE 115-*d* may measure an RSRP of a sidelink message 320 transmitted by each UE 115 of the set of UEs 115 that may cause the relatively high levels of IBE interference.

In some examples, the UE 115-*d* may include the RSRP of the sidelink message 320 (e.g., and respective RSRPs of the set of UEs 115) in the sidelink coordination message 325. In some examples, the UE 115-*a* may quantize the RSRP of the sidelink message 320 in accordance with a set of RSRP ranges (e.g., having uneven step sizes) and may include the quantized RSRP of the sidelink message 320 in the sidelink coordination message 325. In some cases, the UE 115-*a* may quantize each respective RSRP of the set of UEs 115.

In some cases, the UE 115-*d* may include the identifier associated with the UE 115-*f* based on the RSRP of the sidelink message 320. For example, to reduce a quantity bits of the sidelink coordination message and to save sidelink resources, the UE 115-*d* may include, in the sidelink coordination message 325, identifiers associated with UEs 115 that have RSRPs greater than (e.g., greater than or equal to) a threshold RSRP T1. Here, the UE 115-*d* may omit the inclusion of RSRP information (e.g., the RSRP of the sidelink message 320, the quantized RSRP of the sidelink message 320) in the sidelink coordination message 325. The UE 115-*e* may be configured to assume that the RSRP of the UEs 115 corresponding to the identifiers included in the sidelink coordination message 325 are at least greater than (e.g., greater than or equal to) T1.

The UE 115-*e* may receive the sidelink coordination message 325 and may communicate with the UE 115-*d* based on the sidelink coordination message 325. For example, the UE 115-*e* may measure an RSRP of the sidelink coordination message 325. In some cases, the RSRP of the sidelink coordination message 325 may be the same as or similar to an RSRP of sidelink communications transmitted by the UE 115-*e* to the UE 115-*d*. The RSRP of the sidelink coordination message 325 may indicate how vulnerable sidelink communications transmitted by the UE 115-*e* to the UE 115-*d* are to IBE interference. Therefore, the UE 115-*e* may determine whether its transmissions to the UE 115-*d* will suffer from relatively high levels of IBE interference (e.g., IBE interference 395) and may select sidelink resources for communicating with the UE 115-*d*.

For example, the UE 115-*e* may compare a ratio of the indicated (e.g., quantized) RSRP of the sidelink message 320 and the RSRP of the sidelink coordination message 325 to a threshold ratio T2 to determine whether the ratio satisfies (e.g., is greater than, is greater than or equal to) T2. Alternatively, the UE 115-*e* may compare a difference of the RSRP of the sidelink coordination message 325 and the indicated RSRP of the sidelink message 320 to a threshold difference T3 to determine whether the difference satisfies (e.g., is greater than, is greater than or equal to) T3. Alternatively, the UE 115-*e* may compare the RSRP of the sidelink coordination message 325 to a threshold RSRP T4 (e.g., if the RSRP information is omitted in the sidelink coordination message 325) to determine whether the RSRP of the sidelink coordination message 325 satisfies (e.g., is less than, is less than or equal to) T4. In some examples, the UE 115-*e* may normalize the RSRP of the sidelink coordination message 325 and the indicated RSRP of the sidelink message 320 in accordance with a quantity of subchannels associated with sidelink communications between the UE 115-*e* and the UE 115-*d* (e.g., based on the quantity of subchannels spanned by a resource pool). Here, the UE 115-*e* may use the normalized RSRPs in calculating (e.g., and/or comparing) the ratio, the difference, or the RSRP of sidelink coordination message 325 to T2, T3, or T4, respectively.

If the ratio, the difference, or the RSRP of the sidelink coordination message 325 satisfy T2, T3, or T4, respectively, the UE 115-*e* may determine that its transmissions will suffer from relatively high levels of IBE interference and may select sidelink resources to avoid the IBE interference. For example, the UE 115-*e* may determine a reservation of a first set of sidelink resources for the transmission of a sidelink message 335 by the UE 115-*f* to the UE 115-*d*. In some examples, the UE 115-*e* may determine the reservation of the first set of sidelink resources by decoding SCI 345 transmitted by the UE 115-*f* that reserves the first set of sidelink resources. The UE 115-*e* may identify the identifier associated with the UE 115-*f* included in the SCI 345 and may determine that the reservation corresponds to a UE 115 indicated by the sidelink coordination message 325 (e.g., the UE 115-*f*). In some other examples, the UE 115-*d* may receive the SCI 345 that reserves the first set of sidelink resources and may transmit a sidelink coordination message 330 to the UE 115-*e* that indicates the reservation of the first set of sidelink resources (e.g., and the identifier associated with the UE 115-*f*). In some other examples, another UE 115 (not shown) may receive the SCI 345 that reserves the first set of sidelink resources and may transmit a sidelink coordination message to the UE 115-*e* that indicates the reservation of the first set of sidelink resources (e.g., and the identifier associated with the UE 115-*f*). In some cases, the UE 115-*e* may receive a broadcast message from a UE 115 (e.g., the UE 115-*d*, the UE 115-*f*, another UE 115) that indicates the reservation (e.g., and the identifier associated with the UE 115-*f*). In some other cases, the UE 115-*c* may receive a groupcast message from a UE 115 (e.g., the UE 115-*d*, the UE 115-*f*, another UE 115) that indicates the reservation (e.g., and the identifier associated with the UE 115-*f*). In some examples, the UE 115-*e* may determine that the reservation is valid if a distance associated with the groupcast message is within a threshold distance.

In response to determining the reservation, the UE 115-*e* may avoid selecting sidelink resources that overlap in the time domain with the first set of sidelink resources based on the IBE interference determination. For example, the UE 115-*e* may select (e.g., and reserve) a second set of sidelink resources for the transmission of a sidelink message 340 to the UE 115-*d*, where the second set of sidelink resources are non-overlapping in the time domain with the first set of sidelink resources (e.g., even if time overlapping sidelink resources are available). In this way, the UE 115-*e* may transmit the sidelink message 340 over the second set of sidelink resources to avoid or reduce a level of IBE interference caused by the sidelink message 335, thereby increasing a reliability of the sidelink message 340.

Figure 4:
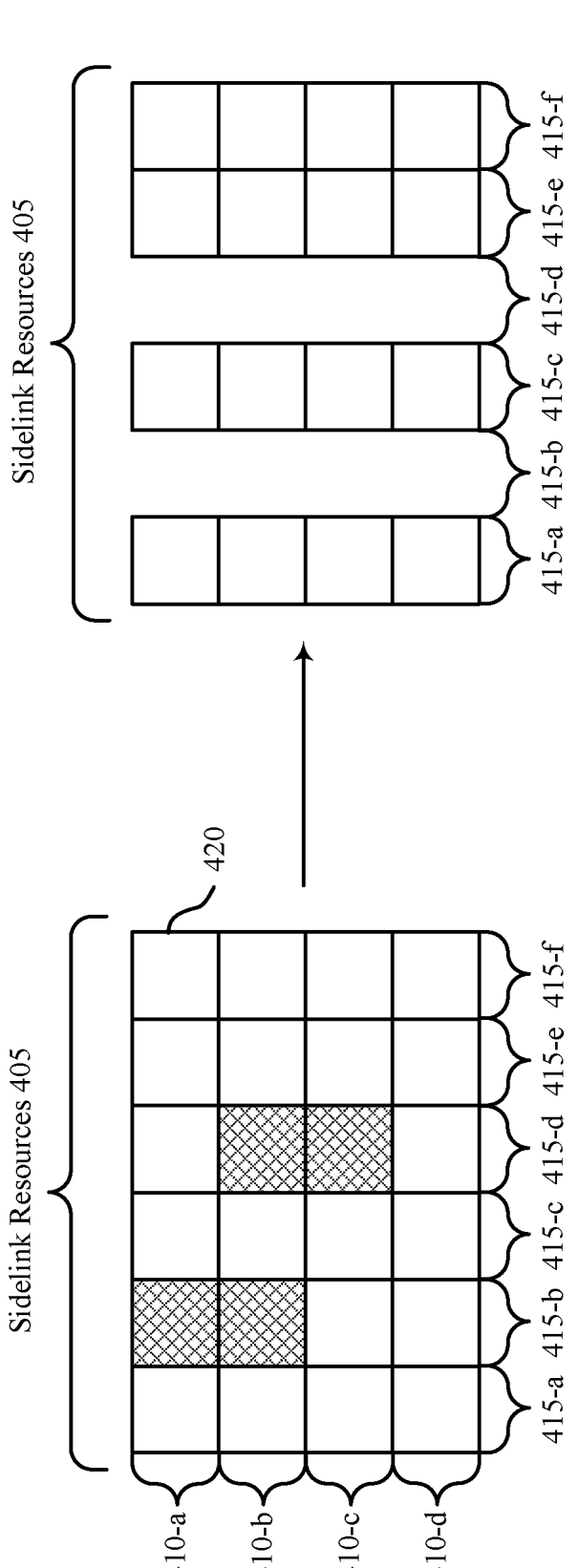
FIG. 4 illustrates an example of a resource pool that supports techniques for managing in-band wireless communication by UE coordination in accordance with aspects of the present disclosure.
Figure 4:

FIG. 4 illustrates an example of a resource pool 400 that supports techniques for managing in-band wireless communication by UE coordination in accordance with aspects of the present disclosure. The resource pool 400 may be implemented by aspects of the wireless communications systems 100, 200, and 300 as described with reference to FIGS. 1 through 3, respectively. For example, the resource pool 400 may be implemented by one or more UEs 115 to support IBE interference coordination techniques, which may provide improvements to sidelink reliability, sidelink resource selection and reservation, resource usage, data rates, spectral efficiency, latency, coordination between devices, power consumption, battery life, and processing capability among other benefits.

The resource pool 400 depicts a set of sidelink resources 405 which spans a quantity of subchannels 410 in a frequency domain and a quantity of slots 415 in a time domain. For example, the resource pool 400 may span a subchannel 410-*a*, a subchannel 410-*b*, a subchannel 410-*c*, and a subchannel 410-*d* in the frequency domain and may span a slot 415-*a*, a slot 415-*b*, a slot 415-*c*, a slot 415-*d*, a slot 415-*e*, a slot 415-*f* in the time domain. The set of sidelink resources 405 may include sidelink resources 420, where a sidelink resource 420 corresponds to the intersection of a subchannel 410 and a slot 415 (e.g., a sidelink resource 420 corresponding to subchannel 410-*a* and slot 415-*f*). It is noted that, for illustrative purposes, FIG. 4 depicts the set of sidelink resources 405 as spanning four subchannels 410 and six slots 415, however the principles disclosed herein may be adapted and applied for the set of sidelink resources 405 to span any quantity of subchannels 410 and slots 415.

To support IBE interference coordination techniques, a first UE 115 may refrain from selecting sidelink resources 420 that overlap in a time domain with sidelink resources 420 reserved by a second UE 115 whose identifier is included in a sidelink coordination message. For example, the first UE 115 may determine a reservation by the second UE 115 for sidelink resources 420 corresponding to slot 415-*b* and subchannels 410-*a*, 410-*b* and corresponding to slot 415-*d* and subchannels 410-*b*, 410-*c* (as depicted by the cross-hatch shading in FIG. 4). Other sidelink resources 420 of slot 415-*b* and slot 415-*d* may be available (e.g., unreserved), however, to avoid causing or suffering from IBE interference, the first UE 115 may refrain from selecting sidelink resources 420 in slot 415-*b* and slot 415-*d*. Instead the first UE 115 may select from available sidelink resources 420 in slots 415-*a*, 415-*c*, 415-*e*, and/or 415-*f* for reservation and transmission of sidelink messages.

The first UE 115 may support various techniques for avoiding selecting time overlapping sidelink resources 420. In a first example, the set of sidelink resources 405 may be a candidate set of sidelink resources from which the first UE 115 may select sidelink resources 420. Here, the first UE 115 may remove the sidelink resources 420 of slot 415-*b* and slot 415-*d* from the candidate set of sidelink resources based on determining the reservation by the second UE 115 for sidelink resources 420 included in slot 415-*b* and slot 415-*d* (e.g., and an RSRP of the sidelink coordination message). In some examples, removing the sidelink resources 420 may include marking the sidelink resources associated with slot 415-*b* and slot 415-*d* as reserved and thus, the first UE 115 may avoid selecting sidelink resources 420 associated with slot 415-*b* and slot 415-*d*.

In a second example, the set of sidelink resources 405 may correspond to a set of sidelink resources reported to a MAC layer of the first UE 115. Here, the first UE 115 may remove the sidelink resources of slot 415-*b* and slot 415-*d* from the set of sidelink resources 405 (e.g., based on determining the reservation and the RSRP of the sidelink coordination message) and may signal (e.g., report) the set of sidelink resources 405 including sidelink resources 420 of slots 415-*a*, 415-*c*, 415-*e*, and 415-*f* to the MAC layer. Sidelink resources 420 associated with slot 415-*b* and slot 415-*d* may be unavailable for selection.

In a third example, the first UE 115 may signal the set of sidelink resources 405 that includes the sidelink resources 420 of slots 415-*a* through 415-*f* to the MAC layer. Here, the first UE 115 avoid selecting any sidelink resources 420 associated with slot 415-*b* and slot 415-*d* at the MAC layer based on determining the reservation by the second UE 115 (e.g., and the RSRP of the sidelink coordination message).

FIG. 5 illustrates an example of a process flow 500 that supports techniques for managing in-band wireless communication by UE coordination in accordance with aspects of the present disclosure. The process flow 500 may implement aspects of the wireless communications systems 100, 200, and 300, or may be implemented by aspects of the wireless communications system 100, 200, and 300 as described with reference to FIGS. 1 through 3, respectively. For example, the process flow 500 may be implemented by a UE 115-*g*, a UE 115-*h*, and a UE 115-*i* to support IBE interference coordination techniques to increase reliability of sidelink communications and improve sidelink resource selection and reservation schemes (e.g., during Mode 2 operation). The process flow 500 may further be implemented by the UE 115-*g*, the UE 115-*h*, and the UE 115-*i* to provide improvements to data rates, spectral efficiency, coordination between devices, power consumption, resource usage, battery life, and processing capability among other benefits. The UE 115-*g*, the UE 115-*h*, and the UE 115-*i* may be examples of a UE 115, as described with reference to FIGS. 1 through 3. In the following description of the process flow 500, the operations may be performed in different orders or at different times. Some operations may also be omitted from the process flow 500, and other operations may be added to the process flow 500.

At 505, the UE 115-*i* may optionally transmit a sidelink communication to the UE 115-*h*. The UE 115-*h* may receive the sidelink communication and may measure an RSRP of the sidelink communication. In some cases, the UE 115-*h* may receive a sidelink communication from multiple UEs 115 and measure the RSRP of each sidelink communication. In some examples, the sidelink communication may be an example of SCI that reserves one or more sidelink resources (e.g., of a resource pool) for transmission of one or more sidelink messages to one or more UEs 115 (e.g., to the UE 115-*h*). In some other examples, the sidelink communication may be a sidelink message such as a sidelink coordination message, a sidelink data message, a sidelink feedback message, sidelink control signaling, or some other type of sidelink message (e.g., using sidelink resources previously reserved by SCI transmitted by the UE 115-*i*).

At 510, the UE 115-*h* may optionally quantize the measured RSRP in accordance with a set of RSRP ranges. For example, the UE 115-*h* may determine within which RSRP range of the set of RSRP ranges the measured RSRP is located and may quantize the measured RSRP to an RSRP value corresponding to the RSRP range. In this way, the UE 115-*h* may reduce a quantity of bits used to indicate the RSRP from the UE 115-*i* to the UE 115-*h*. In some examples, the UE 115-*h* may quantize the measured RSRP in accordance with uneven step sizes.

At 515, the UE 115-*h* may transmit a sidelink coordination message to the UE 115-*g* that includes a set of identifiers associated with a set of UEs 115. For example, the sidelink coordination message may include one or more identifiers associated with the UEs 115 from which the UE 115-*h* received a sidelink communication and measured an RSRP of the sidelink communication. For instance, the sidelink coordination message may include an identifier of the UE 115-*i*. In some examples, the set of identifiers may include identifiers of UEs 115 from which the UE 115-*h* receives (e.g., will receive) sidelink messages. In some cases, the set of identifiers may include a first subset of identifiers of UEs 115 from which the UE 115-*h* received sidelink messages and a second subset of identifiers of UEs 115 from which the UE 115-*h* may not receive sidelink messages. In some other examples, the set of identifiers may include identifiers of UEs 115 that may cause a relatively high level of IBE interference at the UE 115-*h*. For example, the set of identifiers may include identifiers of UEs 115 for which an RSRP between the UE 115-*h* and a respective UE 115 satisfies (e.g., is greater than, is greater than or equal to) a threshold RSRP. In some cases, the sidelink coordination message may include one or more indications of the measured (e.g., quantized) RSRPs (e.g., an indication of an RSRP for each identifier of the set of identifiers). In some examples, the set of identifiers may include a first set of identifiers associated with a first set of UEs 115 that may cause a relatively high level of IBE interference and a second set of identifiers associated with a second set of UEs 115 whose sidelink transmissions may be vulnerable to relatively high levels of IBE interference.

The UE 115-*g* may receive the sidelink coordination message and may measure an RSRP of the sidelink coordination message. At 520, the UE 115-*g* may determine a reservation of a first set of sidelink resources for a first sidelink communication between the UE 115-*h* and another UE 115, such as the UE 115-*i*. For example, the reservation may be for a first sidelink message transmitted from the UE 115-*i* to the UE 115-*h*. In some examples, the UE 115-*g* may determine the reservation by decoding SCI transmitted by the UE 115-*i* that reserves the first set of sidelink resources. In some other examples, the sidelink coordination message may include an indication of the reservation. In still some other examples, the UE 115-*g* may receive a second sidelink coordination message (e.g., from the UE 115-*h*, or from another UE 115) that indicates the reservation.

At 525, the UE 115-*g* may optionally remove sidelink resources from a second set of sidelink resources that includes the first set of sidelink resources based on the reservation of the first set of sidelink resources and the RSRP of the sidelink coordination message. For example, if the RSRP of the sidelink coordination message satisfies a threshold RSRP, the UE 115-*g* may remove any slots occupied by the first set of sidelink resources. That is, if a sidelink resource of the first set of sidelink resources is located in a slot, the UE 115-*g* may remove all the sidelink resources of the slot from the second set of sidelink resources. Alternatively, if a ratio or a difference of the RSRP of the sidelink coordination message and the (e.g., quantized) RSRP from UE 115-*i* to the UE 115-*h* indicated by the sidelink coordination message satisfies a threshold ratio or a threshold difference, respectively, the UE 115-*g* may remove the sidelink resources corresponding to the occupied slots. In some examples, the second set of sidelink resources may correspond to a resource pool of sidelink resource. Thus, removing sidelink resources of the second set of sidelink resources may reduce the resource pool to include sidelink resources that are non-overlapping in a time domain with the first set of sidelink resources.

At 530, the UE 115-*g* may select (e.g., and reserve via SCI) a third set of sidelink resources for a second sidelink communication between the UE 115-*h* and the UE 115-*g*. For example, the third set of sidelink resources may be for a second sidelink message transmitted from the UE 115-*g* to the UE 115-*h*. In some examples, the UE 115-*g* may select the third set of sidelink resources from the second set of sidelink resources after removal of the sidelink resources from the second set of sidelink resources. In some cases, the UE 115-*g* may select the third set of sidelink resources such that the third set of sidelink resources are non-overlapping in the time domain with (e.g., are located in different slots than) the first set of sidelink resources based on the RSRP of the sidelink coordination message satisfying the threshold RSRP or based on the ratio or the difference of the RSRP of the sidelink coordination message and the RSRP from UE 115-*i* to the UE 115-*h* satisfying the threshold.

At 535, the UE 115-*i* and the UE 115-*h* may optionally perform the first sidelink communication over the first set of sidelink resources. For example, the UE 115-*i* may transmit the first sidelink message to the UE 115-*h* over the first set of sidelink resources. At 540, the UE 115-*g* and the UE 115-*h* may perform the second sidelink communication over the third set of sidelink resources. For example, the UE 115-*g* may transmit the second sidelink message to the UE 115-*h* over the third set of sidelink resources.

Figure 6:
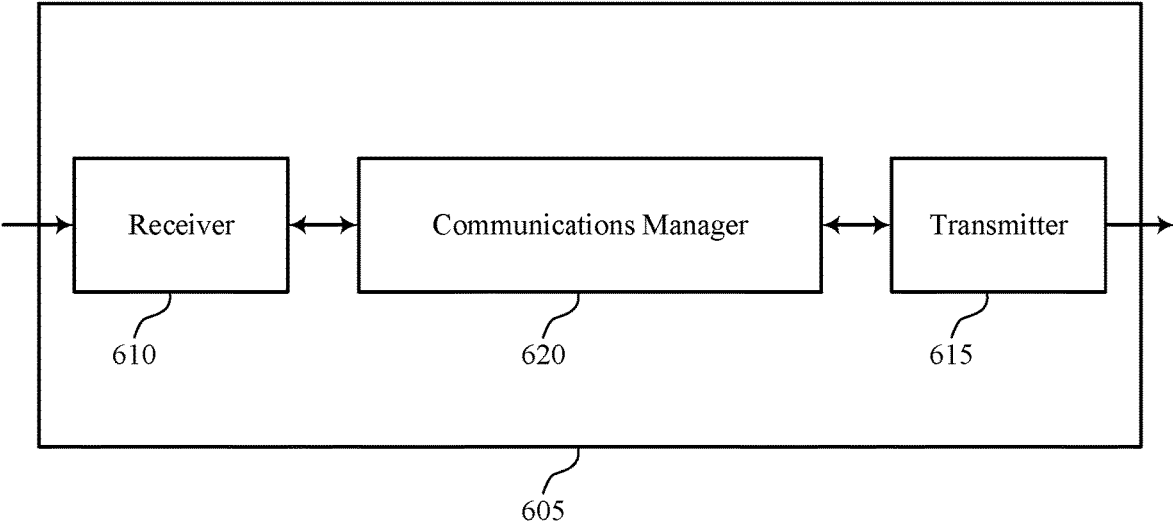
FIGS. 6 and 7 show block diagrams of devices that support techniques for managing in-band wireless communication by UE coordination in accordance with aspects of the present disclosure.

FIG. 6 shows a block diagram 600 of a device 605 that supports techniques for managing in-band wireless communication by UE coordination in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for managing in-band wireless communication by UE coordination). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for managing in-band wireless communication by UE coordination). In some examples, the transmitter 615 may be co-located with a receiver 610 in a transceiver. The transmitter 615 may utilize a single antenna or a set of multiple antennas.

The communications manager 620, the receiver 610, the transmitter 615, or various combinations thereof or various components thereof may be examples of means for performing various aspects of techniques for managing in-band wireless communication by UE coordination as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at the device 605 (e.g., a first UE) in accordance with examples as disclosed herein. For example, the communications manager 620 may be configured as or otherwise support a means for receiving, from a second UE, a sidelink coordination message including a set of identifiers associated with a set of UEs. The communications manager 620 may be configured as or otherwise support a means for determining a reservation of a first set of sidelink resources for a first sidelink communication between the second UE and a third UE of the set of UEs based on an identifier of the set of identifiers associated with the third UE. The communications manager 620 may be configured as or otherwise support a means for selecting a second set of sidelink resources for a second sidelink communication based on the reservation of the first set of sidelink resources and an RSRP associated with the sidelink coordination message. The communications manager 620 may be configured as or otherwise support a means for performing the second sidelink communication based on the second set of sidelink resources.

Additionally or alternatively, the communications manager 620 may support wireless communication at the device 605 (e.g., a first UE) in accordance with examples as disclosed herein. For example, the communications manager 620 may be configured as or otherwise support a means for transmitting, to a second UE, a sidelink coordination message including a set of identifiers associated with a set of UEs. The communications manager 620 may be configured as or otherwise support a means for receiving, from the second UE, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources by performing sidelink communications using sidelink resources selected to mitigate or eliminate IBE interference, thus increasing sidelink reliability and reducing retransmissions of sidelink communications.

Figure 7:
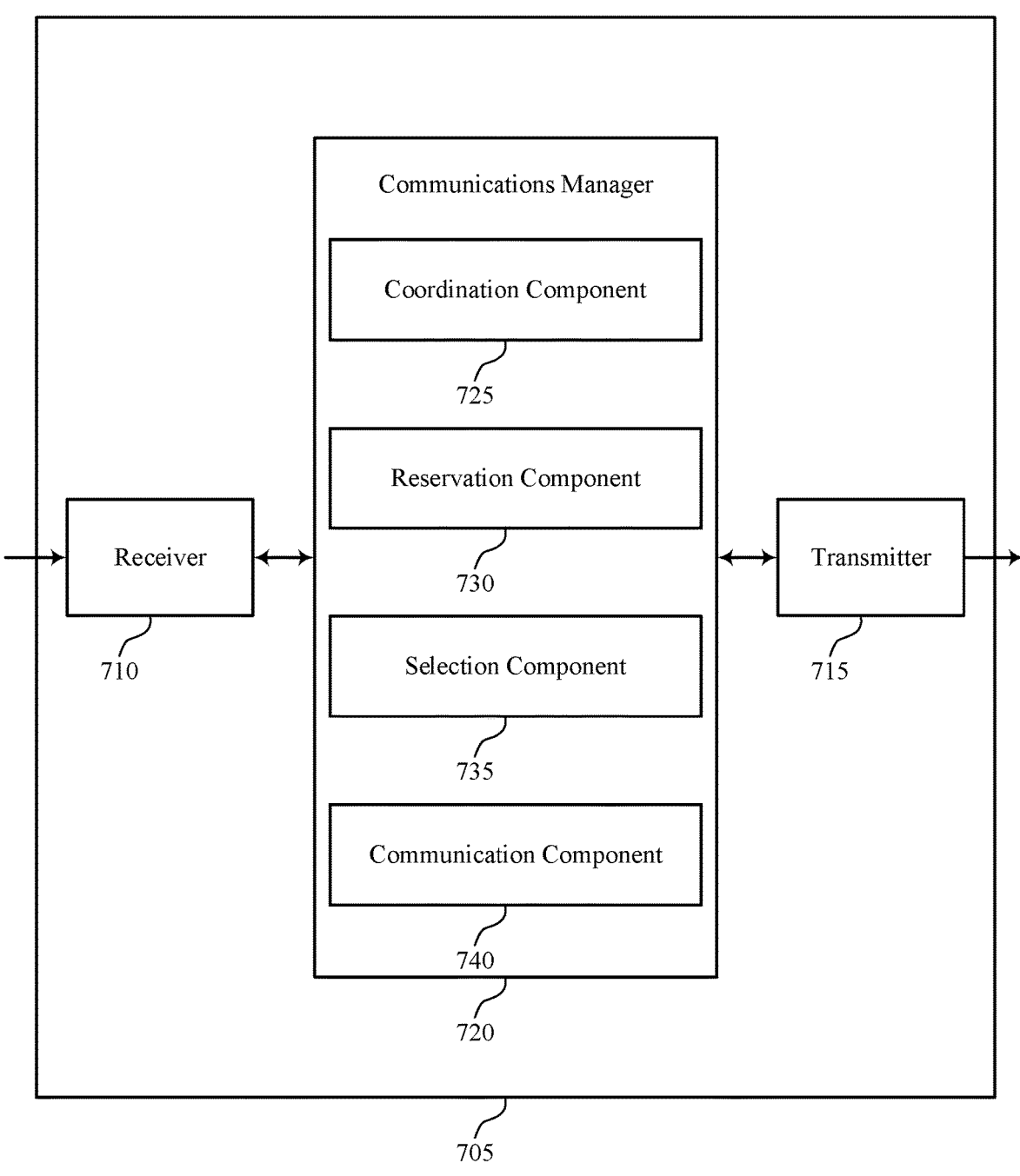

FIG. 7 shows a block diagram 700 of a device 705 that supports techniques for managing in-band wireless communication by UE coordination in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for managing in-band wireless communication by UE coordination). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for managing in-band wireless communication by UE coordination). In some examples, the transmitter 715 may be co-located with a receiver 710 in a transceiver. The transmitter 715 may utilize a single antenna or a set of multiple antennas.

The device 705, or various components thereof, may be an example of means for performing various aspects of techniques for managing in-band wireless communication by UE coordination as described herein. For example, the communications manager 720 may include a coordination component 725, a reservation component 730, a selection component 735, a communication component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at the device 705 (e.g., a first UE) in accordance with examples as disclosed herein. The coordination component 725 may be configured as or otherwise support a means for receiving, from a second UE, a sidelink coordination message including a set of identifiers associated with a set of UEs. The reservation component 730 may be configured as or otherwise support a means for determining a reservation of a first set of sidelink resources for a first sidelink communication between the second UE and a third UE of the set of UEs based on an identifier of the set of identifiers associated with the third UE. The selection component 735 may be configured as or otherwise support a means for selecting a second set of sidelink resources for a second sidelink communication based on the reservation of the first set of sidelink resources and an RSRP associated with the sidelink coordination message. The communication component 740 may be configured as or otherwise support a means for performing the second sidelink communication based on the second set of sidelink resources.

Additionally or alternatively, the communications manager 720 may support wireless communication at the device 705 (e.g., a first UE) in accordance with examples as disclosed herein. The coordination component 725 may be configured as or otherwise support a means for transmitting, to a second UE, a sidelink coordination message including a set of identifiers associated with a set of UEs. The communication component 740 may be configured as or otherwise support a means for receiving, from the second UE, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs.

Figure 8:
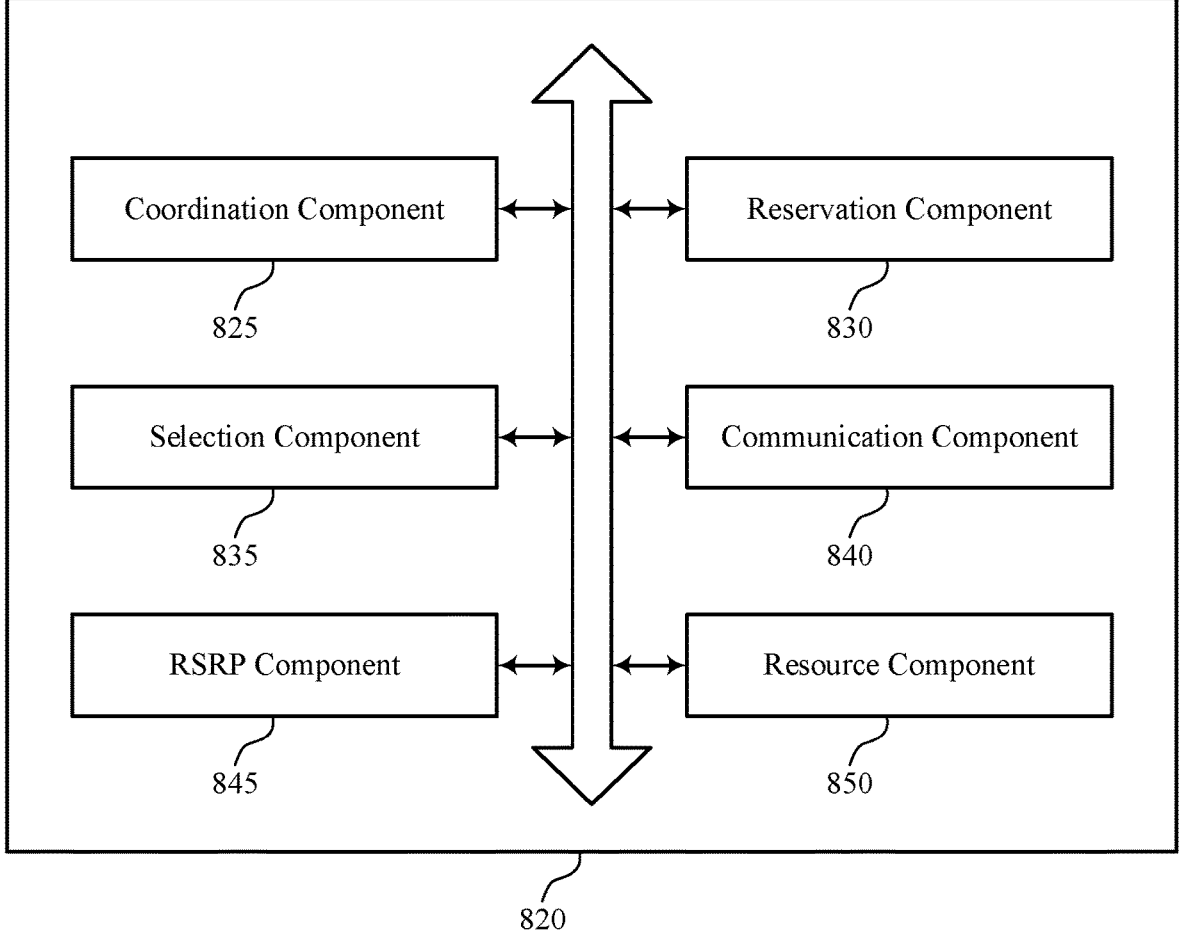
FIG. 8 shows a block diagram of a communications manager that supports techniques for managing in-band wireless communication by UE coordination in accordance with aspects of the present disclosure.

FIG. 8 shows a block diagram 800 of a communications manager 820 that supports techniques for managing in-band wireless communication by UE coordination in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for managing in-band wireless communication by UE coordination as described herein. For example, the communications manager 820 may include a coordination component 825, a reservation component 830, a selection component 835, a communication component 840, an RSRP component 845, a resource component 850, or any combination thereof. Each of these components may communicate, directly or indirectly, with one another (e.g., via one or more buses).

The communications manager 820 may support wireless communication at a first UE in accordance with examples as disclosed herein. The coordination component 825 may be configured as or otherwise support a means for receiving, from a second UE, a sidelink coordination message including a set of identifiers associated with a set of UEs. The reservation component 830 may be configured as or otherwise support a means for determining a reservation of a first set of sidelink resources for a first sidelink communication between the second UE and a third UE of the set of UEs based on an identifier of the set of identifiers associated with the third UE. The selection component 835 may be configured as or otherwise support a means for selecting a second set of sidelink resources for a second sidelink communication based on the reservation of the first set of sidelink resources and an RSRP associated with the sidelink coordination message. The communication component 840 may be configured as or otherwise support a means for performing the second sidelink communication based on the second set of sidelink resources.

In some examples, the RSRP component 845 may be configured as or otherwise support a means for determining that the RSRP associated with the sidelink coordination message satisfies a threshold RSRP, where selecting the second set of sidelink resources is based on the RSRP associated with the sidelink coordination message satisfying the threshold RSRP. In some examples, the RSRP component 845 may be configured as or otherwise support a means for determining a second RSRP associated with communications between the second UE and the third UE based on an indication in the sidelink coordination message, where selecting the second set of sidelink resources is based on the second RSRP.

In some examples, the RSRP component 845 may be configured as or otherwise support a means for determining that a ratio of the RSRP associated with the sidelink coordination message and the second RSRP satisfies a threshold ratio, where selecting the second set of sidelink resources is based on the ratio of the RSRP associated with the sidelink coordination message and the second RSRP satisfying the threshold ratio. In some examples, the RSRP component 845 may be configured as or otherwise support a means for determining that a difference between the RSRP associated with the sidelink coordination message and the second RSRP satisfies a threshold difference, where selecting the second set of sidelink resources is based on the difference between the RSRP associated with the sidelink coordination message and the second RSRP satisfying the threshold difference.

In some examples, the reservation component 830 may be configured as or otherwise support a means for decoding SCI including the identifier associated with the third UE, where determining the reservation of the first set of sidelink resources is based on decoding the SCI. In some examples, the coordination component 825 may be configured as or otherwise support a means for receiving a second sidelink coordination message including the identifier associated with the third UE and indicating the first set of sidelink resources, where determining the reservation of the first set of sidelink resources is based on receiving the second sidelink coordination message.

In some examples, the resource component 850 may be configured as or otherwise support a means for removing, from a set of candidate sidelink resources including the first set of sidelink resources and the second set of sidelink resources, sidelink resources associated with one or more slots based on the reservation of the first set of sidelink resources and the RSRP associated with the sidelink coordination message, the first set of sidelink resources corresponding to the one or more slots, where selecting the second set of sidelink resources is based on removing the sidelink resources from the set of candidate sidelink resources.

In some examples, the resource component 850 may be configured as or otherwise support a means for removing, from a third set of sidelink resources including the first set of sidelink resources and the second set of sidelink resources, sidelink resources associated with one or more slots based on the reservation of the first set of sidelink resources and the RSRP associated with the sidelink coordination message, the first set of sidelink resources corresponding to the one or more slots. In some examples, the resource component 850 may be configured as or otherwise support a means for reporting the third set of sidelink resources to a MAC layer associated with the first UE, where selecting the second set of sidelink resources is based on signaling the third set of sidelink resources.

In some examples, the selection component 835 may be configured as or otherwise support a means for refraining from selecting sidelink resources in a first set of slots associated with the first set of sidelink resources for the second sidelink communication based on the RSRP associated with the sidelink coordination message, where the second set of sidelink resources are associated with a second set of slots different from the first set of slots. In some examples, to support selecting the second set of sidelink resources, the selection component 835 may be configured as or otherwise support a means for selecting the second set of sidelink resources in a first slot that is non-overlapping in a time domain with a second slot associated with the first set of sidelink resources.

In some examples, the RSRP component 845 may be configured as or otherwise support a means for measuring the RSRP associated with the sidelink coordination message based on receiving the sidelink coordination message. In some examples, the RSRP component 845 may be configured as or otherwise support a means for normalizing the RSRP associated with the sidelink coordination message based on a quantity of subchannels associated with sidelink communications between the first UE and the second UE, where selecting the second set of sidelink resources is based on the normalized RSRP. In some examples, the set of identifiers includes identifiers associated with UEs from which the second UE receives sidelink messages. In some examples, the set of identifiers includes identifiers associated with UEs for which a second RSRP between the second UE and a respective UE satisfies a threshold RSRP.

In some examples, the reservation component 830 may be configured as or otherwise support a means for determining the reservation of the first set of sidelink resources based at least in part on receiving a broadcast message that includes the identifier associated with the third UE, receiving a groupcast message that includes the identifier associated with the third UE, a distance associated with the groupcast message, or a combination thereof.

Additionally or alternatively, the communications manager 820 may support wireless communication at a first UE in accordance with examples as disclosed herein. In some examples, the coordination component 825 may be configured as or otherwise support a means for transmitting, to a second UE, a sidelink coordination message including a set of identifiers associated with a set of UEs. In some examples, the communication component 840 may be configured as or otherwise support a means for receiving, from a second UE of the set of UEs, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs.

In some examples, the sidelink coordination message indicates a second RSRP associated with communications between the first UE and the third UE. In some examples, the RSRP component 845 may be configured as or otherwise support a means for measuring a third RSRP of a sidelink message received from the third UE. In some examples, the RSRP component 845 may be configured as or otherwise support a means for quantizing the third RSRP in accordance with a set of RSRP ranges, where the second RSRP corresponds to the quantized third RSRP. In some examples, the RSRP component 845 may be configured as or otherwise support a means for receiving a configuration message that indicates the set of reference signal received power ranges.

In some examples, a first RSRP range of the set of RSRP ranges is associated with a first step size different from a second step size associated with a second RSRP range of the set of RSRP ranges. In some examples, receiving the first sidelink communication over the first set of sidelink resources is based on a ratio of the RSRP and the second RSRP satisfying a threshold ratio. In some examples, receiving the first sidelink communication over the first set of sidelink resources is based on a difference between the RSRP and the second RSRP satisfying a threshold difference. In some examples, receiving the first sidelink communication over the first set of sidelink resources is based on the RSRP satisfying a threshold RSRP.

In some examples, the coordination component 825 may be configured as or otherwise support a means for transmitting, to the second UE, a second sidelink coordination message including an identifier of the set of identifiers associated with the third UE and indicating the second set of sidelink resources, where receiving the first sidelink communication over the first set of sidelink resources is based on transmitting the second sidelink coordination message. In some examples, the sidelink coordination message may include the identifier associated with the third UE and may indicate the second set of sidelink resources. In some examples, the set of identifiers includes identifiers associated with UEs from which the first UE receives sidelink messages. In some examples, the set of identifiers includes identifiers associated with UEs for which a second RSRP between the first UE and a respective UE satisfies a threshold RSRP. In some examples, the RSRP component 845 may be configured as or otherwise support a means for receiving a configuration message that indicates the threshold reference signal received power.

Figure 9:
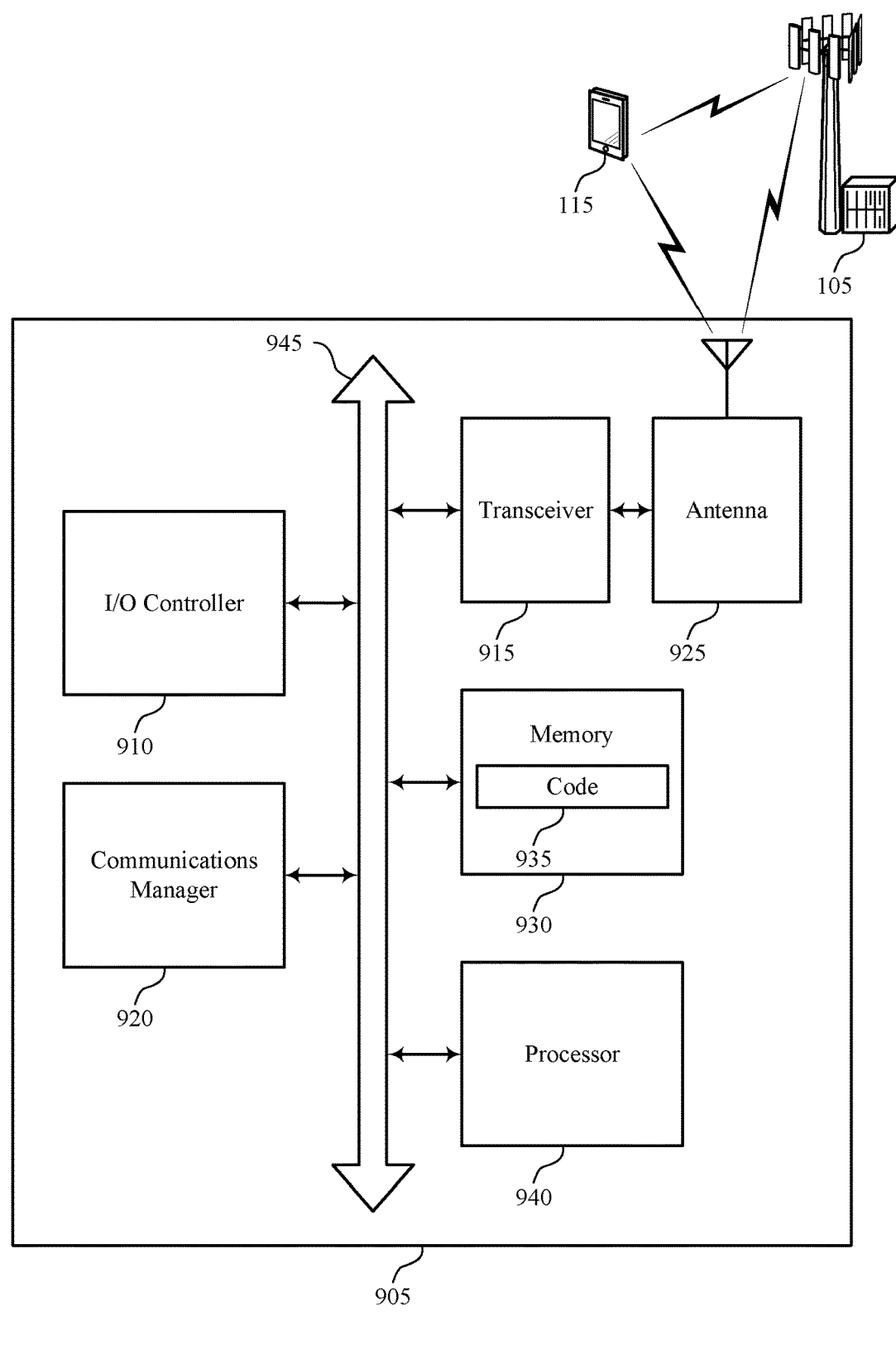
FIG. 9 shows a diagram of a system including a device that supports techniques for managing in-band wireless communication by UE coordination in accordance with aspects of the present disclosure.

FIG. 9 shows a diagram of a system 900 including a device 905 that supports techniques for managing in-band wireless communication by UE coordination in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for managing in-band wireless communication by UE coordination). For example, the device 905 or a component of the device 905 may include a processor 940 and memory 930 coupled to the processor 940, the processor 940 and memory 930 configured to perform various functions described herein.

The communications manager 920 may support wireless communication at the device 905 (e.g., a first UE) in accordance with examples as disclosed herein. For example, the communications manager 920 may be configured as or otherwise support a means for receiving, from a second UE, a sidelink coordination message including a set of identifiers associated with a set of UEs. The communications manager 920 may be configured as or otherwise support a means for determining a reservation of a first set of sidelink resources for a first sidelink communication between the second UE and a third UE of the set of UEs based on an identifier of the set of identifiers associated with the third UE. The communications manager 920 may be configured as or otherwise support a means for selecting a second set of sidelink resources for a second sidelink communication based on the reservation of the first set of sidelink resources and an RSRP associated with the sidelink coordination message. The communications manager 920 may be configured as or otherwise support a means for performing the second sidelink communication based on the second set of sidelink resources.

Additionally or alternatively, the communications manager 920 may support wireless communication at the device 905 (e.g., a first UE) in accordance with examples as disclosed herein. For example, the communications manager 920 may be configured as or otherwise support a means for transmitting, to a second UE, a sidelink coordination message including a set of identifiers associated with a set of UEs. The communications manager 920 may be configured as or otherwise support a means for receiving, from the second UE, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs.

By including or configuring the communications manager 920 in accordance with examples as described herein, the device 905 may support techniques for improved reliability, sidelink resource selection and reservation, latency, resource utilization, power consumption, data rates, user experience related to reduced processing, coordination between devices, spectral efficiency, battery life, and processing capability, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for managing in-band wireless communication by UE coordination as described herein, or the processor 940 and the memory 930 may be otherwise configured to perform or support such operations.

FIG. 10 shows a flowchart illustrating a method 1000 that supports techniques for managing in-band wireless communication by UE coordination in accordance with aspects of the present disclosure. The operations of the method 1000 may be implemented by a first UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a second UE, a sidelink coordination message including a set of identifiers associated with a set of UEs. The operations of 1005 may be performed in accordance with examples as disclosed herein. In some examples, aspects of the operations of 1005 may be performed by a coordination component 825 as described with reference to FIG. 8.

At 1010, the method may include determining a reservation of a first set of sidelink resources for a first sidelink communication between the second UE and a third UE of the set of UEs based on an identifier of the set of identifiers associated with the third UE. The operations of 1010 may be performed in accordance with examples as disclosed herein. In some examples, aspects of the operations of 1010 may be performed by a reservation component 830 as described with reference to FIG. 8.

At 1015, the method may include selecting a second set of sidelink resources for a second sidelink communication based on the reservation of the first set of sidelink resources and an RSRP associated with the sidelink coordination message. The operations of 1015 may be performed in accordance with examples as disclosed herein. In some examples, aspects of the operations of 1015 may be performed by a selection component 835 as described with reference to FIG. 8.

At 1020, the method may include performing the second sidelink communication based on the second set of sidelink resources. The operations of 1020 may be performed in accordance with examples as disclosed herein. In some examples, aspects of the operations of 1020 may be performed by a communication component 840 as described with reference to FIG. 8.

FIG. 11 shows a flowchart illustrating a method 1100 that supports techniques for managing in-band wireless communication by UE coordination in accordance with aspects of the present disclosure. The operations of the method 1100 may be implemented by a first UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a second UE, a sidelink coordination message including a set of identifiers associated with a set of UEs. The operations of 1105 may be performed in accordance with examples as disclosed herein. In some examples, aspects of the operations of 1105 may be performed by a coordination component 825 as described with reference to FIG. 8.

At 1110, the method may include determining a reservation of a first set of sidelink resources for a first sidelink communication between the second UE and a third UE of the set of UEs based on an identifier of the set of identifiers associated with the third UE. The operations of 1110 may be performed in accordance with examples as disclosed herein.

In some examples, aspects of the operations of 1110 may be performed by a reservation component 830 as described with reference to FIG. 8.

At 1115, the method may include determining that an RSRP associated with the sidelink coordination message satisfies a threshold RSRP. The operations of 1115 may be performed in accordance with examples as disclosed herein. In some examples, aspects of the operations of 1115 may be performed by an RSRP component 845 as described with reference to FIG. 8.

At 1120, the method may include selecting a second set of sidelink resources for a second sidelink communication based on the reservation of the first set of sidelink resources and the RSRP satisfying the threshold RSRP. The operations of 1120 may be performed in accordance with examples as disclosed herein. In some examples, aspects of the operations of 1120 may be performed by a selection component 835 as described with reference to FIG. 8.

At 1125, the method may include performing the second sidelink communication based on the second set of sidelink resources. The operations of 1125 may be performed in accordance with examples as disclosed herein. In some examples, aspects of the operations of 1125 may be performed by a communication component 840 as described with reference to FIG. 8.

FIG. 12 shows a flowchart illustrating a method 1200 that supports techniques for managing in-band wireless communication by UE coordination in accordance with aspects of the present disclosure. The operations of the method 1200 may be implemented by a first UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a second UE, a sidelink coordination message including a set of identifiers associated with a set of UEs. The operations of 1205 may be performed in accordance with examples as disclosed herein. In some examples, aspects of the operations of 1205 may be performed by a coordination component 825 as described with reference to FIG. 8.

At 1210, the method may include determining a reservation of a first set of sidelink resources for a first sidelink communication between the second UE and a third UE of the set of UEs based on an identifier of the set of identifiers associated with the third UE. The operations of 1210 may be performed in accordance with examples as disclosed herein. In some examples, aspects of the operations of 1210 may be performed by a reservation component 830 as described with reference to FIG. 8.

At 1215, the method may include determining a first RSRP associated with communications between the second UE and the third UE based on an indication in the sidelink coordination message. The operations of 1215 may be performed in accordance with examples as disclosed herein. In some examples, aspects of the operations of 1215 may be performed by an RSRP component 845 as described with reference to FIG. 8.

At 1220, the method may include selecting a second set of sidelink resources for a second sidelink communication based on the reservation of the first set of sidelink resources, the first RSRP, and a second RSRP associated with the sidelink coordination message. The operations of 1220 may be performed in accordance with examples as disclosed herein. In some examples, aspects of the operations of 1220 may be performed by a selection component 835 as described with reference to FIG. 8.

At 1225, the method may include performing the second sidelink communication based on the second set of sidelink resources. The operations of 1225 may be performed in accordance with examples as disclosed herein. In some examples, aspects of the operations of 1225 may be performed by a communication component 840 as described with reference to FIG. 8.

FIG. 13 shows a flowchart illustrating a method 1300 that supports techniques for managing in-band wireless communication by UE coordination in accordance with aspects of the present disclosure. The operations of the method 1300 may be implemented by a first UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include transmitting, to a second UE, a sidelink coordination message including a set of identifiers associated with a set of UEs. The operations of 1305 may be performed in accordance with examples as disclosed herein. In some examples, aspects of the operations of 1305 may be performed by a coordination component 825 as described with reference to FIG. 8.

At 1310, the method may include receiving, from the second UE, a first sidelink communication over a first set of sidelink resources, the first set of sidelink resources selected based on an RSRP associated with the sidelink coordination message and a reservation of a second set of sidelink resources for a second sidelink communication between the first UE and a third UE of the set of UEs. The operations of 1310 may be performed in accordance with examples as disclosed herein. In some examples, aspects of the operations of 1310 may be performed by a communication component 840 as described with reference to FIG. 8.

FIG. 14 shows a flowchart illustrating a method 1400 that supports techniques for managing in-band wireless communication by UE coordination in accordance with aspects of the present disclosure. The operations of the method 1400 may be implemented by a first UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include measuring a first RSRP of a sidelink message received from a second UE of a set of UEs. The operations of 1405 may be performed in accordance with examples as disclosed herein. In some examples, aspects of the operations of 1405 may be performed by an RSRP component 845 as described with reference to FIG. 8.

At 1410, the method may include quantizing the first RSRP in accordance with a set of RSRP ranges. The operations of 1410 may be performed in accordance with examples as disclosed herein. In some examples, aspects of the operations of 1410 may be performed by an RSRP component 845 as described with reference to FIG. 8.

At 1415, the method may include transmitting, to a third UE, a sidelink coordination message including a set of identifiers associated with the set of UEs and indicating a second RSRP associated with communications between the first UE and the second UE, the second RSRP corresponding to the quantized first RSRP. The operations of 1415 may be performed in accordance with examples as disclosed herein. In some examples, aspects of the operations of 1415 may be performed by a coordination component 825 as described with reference to FIG. 8.

At 1420, the method may include receiving, from the third UE, a first sidelink communication over a first set of sidelink resources, the first set of sidelink resources selected based on a third RSRP associated with the sidelink coordination message and a reservation of a second set of sidelink resources for a second sidelink communication between the first UE and the second UE. The operations of 1420 may be performed in accordance with examples as disclosed herein. In some examples, aspects of the operations of 1420 may be performed by a communication component 840 as described with reference to FIG. 8.

The following provides an overview of aspects of the present disclosure:

Aspect 1: A method for wireless communication at a first UE, comprising: receiving, from a second UE, a sidelink coordination message including a set of identifiers associated with a set of UEs; determining a reservation of a first set of sidelink resources for a first sidelink communication between the second UE and a third UE of the set of UEs based at least in part on an identifier of the set of identifiers associated with the third UE; selecting a second set of sidelink resources for a second sidelink communication based at least in part on the reservation of the first set of sidelink resources and an RSRP associated with the sidelink coordination message; and performing the second sidelink communication based at least in part on the second set of sidelink resources.

Aspect 2: The method of aspect 1, further comprising: determining that the RSRP associated with the sidelink coordination message satisfies a threshold RSRP, wherein selecting the second set of sidelink resources is based at least in part on the RSRP associated with the sidelink coordination message satisfying the threshold RSRP.

Aspect 3: The method of any of aspects 1 through 2, further comprising: determining a second RSRP associated with communications between the second UE and the third UE based at least in part on an indication in the sidelink coordination message, wherein selecting the second set of sidelink resources is based at least in part on the second RSRP.

Aspect 4: The method of aspect 3, further comprising: determining that a ratio of the RSRP associated with the sidelink coordination message and the second RSRP satisfies a threshold ratio, wherein selecting the second set of sidelink resources is based at least in part on the ratio of the RSRP associated with the sidelink coordination message and the second RSRP satisfying the threshold ratio.

Aspect 5: The method of aspect 3, further comprising: determining that a difference between the RSRP associated with the sidelink coordination message and the second RSRP satisfies a threshold difference, wherein selecting the second set of sidelink resources is based at least in part on the difference between the RSRP associated with the sidelink coordination message and the second RSRP satisfying the threshold difference.

Aspect 6: The method of any of aspects 1 through 5, further comprising: decoding SCI including the identifier associated with the third UE, wherein determining the reservation of the first set of sidelink resources is based at least in part on decoding the SCI.

Aspect 7: The method of any of aspects 1 through 5, further comprising: receiving a second sidelink coordination message including the identifier associated with the third UE and indicating the first set of sidelink resources, wherein determining the reservation of the first set of sidelink resources is based at least in part on receiving the second sidelink coordination message.

Aspect 8: The method of any of aspects 1 through 7, further comprising: removing, from a set of candidate sidelink resources including the first set of sidelink resources and the second set of sidelink resources, sidelink resources associated with one or more slots based at least in part on the reservation of the first set of sidelink resources and the RSRP associated with the sidelink coordination message, the first set of sidelink resources corresponding to the one or more slots, wherein selecting the second set of sidelink resources is based at least in part on removing the sidelink resources from the set of candidate sidelink resources.

Aspect 9: The method of any of aspects 1 through 7, further comprising: removing, from a third set of sidelink resources including the first set of sidelink resources and the second set of sidelink resources, sidelink resources associated with one or more slots based at least in part on the reservation of the first set of sidelink resources and the RSRP associated with the sidelink coordination message, the first set of sidelink resources corresponding to the one or more slots; and reporting the third set of sidelink resources to a MAC layer associated with the first UE, wherein selecting the second set of sidelink resources is based at least in part on reporting the third set of sidelink resources.

Aspect 10: The method of any of aspects 1 through 9, further comprising: refraining from selecting sidelink resources in a first set of slots associated with the first set of sidelink resources for the second sidelink communication based at least in part on the RSRP associated with the sidelink coordination message, wherein the second set of sidelink resources are associated with a second set of slots different from the first set of slots.

Aspect 11: The method of any of aspects 1 through 10, wherein selecting the second set of sidelink resources comprises: selecting the second set of sidelink resources in a first slot that is non-overlapping in a time domain with a second slot associated with the first set of sidelink resources.

Aspect 12: The method of any of aspects 1 through 11, further comprising: measuring the RSRP associated with the sidelink coordination message based at least in part on receiving the sidelink coordination message; and normalizing the RSRP based at least in part on a quantity of subchannels associated with sidelink communications between the first UE and the second UE, wherein selecting the second set of sidelink resources is based at least in part on the normalized RSRP.

Aspect 13: The method of any of aspects 1 through 12, further comprising: determining the reservation of the first set of sidelink resources based at least in part on receiving a broadcast message that includes the identifier associated with the third UE, receiving a groupcast message that includes the identifier associated with the third UE, a distance associated with the groupcast message, or a combination thereof.

Aspect 14: The method of any of aspects 1 through 13, wherein the set of identifiers includes identifiers associated with UEs from which the second UE receives sidelink messages.

Aspect 15: The method of any of aspects 1 through 14, wherein the set of identifiers includes identifiers associated with UEs for which a second RSRP between the second UE and a respective UE satisfies a threshold RSRP.

Aspect 16: A method for wireless communication at a first UE, comprising: transmitting, to a second UE, a sidelink coordination message including a set of identifiers associated with a set of UEs; and receiving, from the second UE, a first sidelink communication over a first set of sidelink resources, the first set of sidelink resources selected based at least in part on an RSRP associated with the sidelink coordination message and a reservation of a second set of sidelink resources for a second sidelink communication between the first UE and a third UE of the set of UEs.

Aspect 17: The method of aspect 16, wherein the sidelink coordination message indicates a second RSRP associated with communications between the first UE and the third UE.

Aspect 18: The method of aspect 17, further comprising: measuring a third RSRP of a sidelink message received from the third UE; and quantizing the third RSRP in accordance with a set of RSRP ranges, wherein the second RSRP corresponds to the quantized third RSRP.

Aspect 19: The method of aspect 18, further comprising: receiving a configuration message that indicates the set of RSRP ranges.

Aspect 20: The method of any of aspects 18 through 19, wherein a first RSRP range of the set of RSRP ranges is associated with a first step size different from a second step size associated with a second RSRP range of the set of RSRP ranges.

Aspect 21: The method of any of aspects 17 through 20, wherein receiving the first sidelink communication over the first set of sidelink resources is based at least in part on a ratio of the RSRP and the second RSRP satisfying a threshold ratio.

Aspect 22: The method of any of aspects 17 through 20, wherein receiving the first sidelink communication over the first set of sidelink resources is based at least in part on a difference between the RSRP and the second RSRP satisfying a threshold difference.

Aspect 23: The method of any of aspects 16 through 22, wherein receiving the first sidelink communication over the first set of sidelink resources is based at least in part on the RSRP satisfying a threshold RSRP.

Aspect 24: The method of any of aspects 16 through 23, further comprising: transmitting, to the second UE, a second sidelink coordination message including an identifier of the set of identifiers associated with the third UE and indicating the second set of sidelink resources, wherein receiving the first sidelink communication over the first set of sidelink resources is based at least in part on transmitting the second sidelink coordination message.

Aspect 25: The method of any of aspects 16 through 24, wherein the set of identifiers includes identifiers associated with UEs from which the first UE receives sidelink messages.

Aspect 26: The method of any of aspects 16 through 25, wherein the set of identifiers includes identifiers associated with UEs for which a second RSRP between the first UE and a respective UE satisfies a threshold RSRP.

Aspect 27: The method of aspect 26, further comprising: receiving a configuration message that indicates the threshold RSRP.

Aspect 28: An apparatus for wireless communication at a first UE, comprising a processor; memory coupled with the processor; and instructions stored in the memory and executable by the processor to cause the apparatus to perform a method of any of aspects 1 through 15.

Aspect 29: An apparatus for wireless communication at a first UE, comprising at least one means for performing a method of any of aspects 1 through 15.

Aspect 30: A non-transitory computer-readable medium storing code for wireless communication at a first UE, the code comprising instructions executable by a processor to perform a method of any of aspects 1 through 15.

Aspect 31: An apparatus for wireless communication at a first UE, comprising a processor; memory coupled with the processor; and instructions stored in the memory and executable by the processor to cause the apparatus to perform a method of any of aspects 16 through 27.

Aspect 32: An apparatus for wireless communication at a first UE, comprising at least one means for performing a method of any of aspects 16 through 27.

Aspect 33: A non-transitory computer-readable medium storing code for wireless communication at a first UE, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:

receiving, from a second UE, a sidelink coordination message including a set of identifiers associated with a set of UEs;

determining a reservation of a first set of sidelink resources for a first sidelink communication between the second UE and a third UE of the set of UEs based at least in part on an identifier of the set of identifiers associated with the third UE;

selecting a second set of sidelink resources for a second sidelink communication based at least in part on the reservation of the first set of sidelink resources and a reference signal received power associated with the sidelink coordination message; and performing the second sidelink communication based at least in part on the second set of sidelink resources.

2. The method of claim 1, further comprising:

determining that the reference signal received power associated with the sidelink coordination message satisfies a threshold reference signal received power, wherein selecting the second set of sidelink resources is based at least in part on the reference signal received power associated with the sidelink coordination message satisfying the threshold reference signal received power.

3. The method of claim 1, further comprising:

determining a second reference signal received power associated with communications between the second UE and the third UE based at least in part on an indication in the sidelink coordination message, wherein selecting the second set of sidelink resources is based at least in part on the second reference signal received power.

4. The method of claim 3, further comprising:

determining that a ratio of the reference signal received power associated with the sidelink coordination message and the second reference signal received power satisfies a threshold ratio, wherein selecting the second set of sidelink resources is based at least in part on the ratio of the reference signal received power associated with the sidelink coordination message and the second reference signal received power satisfying the threshold ratio.

5. The method of claim 3, further comprising:

determining that a difference between the reference signal received power associated with the sidelink coordination message and the second reference signal received power satisfies a threshold difference, wherein selecting the second set of sidelink resources is based at least in part on the difference between the reference signal received power associated with the sidelink coordination message and the second reference signal received power satisfying the threshold difference.

6. The method of claim 1, further comprising:

decoding sidelink control information including the identifier associated with the third UE, wherein determining the reservation of the first set of sidelink resources is based at least in part on decoding the sidelink control information.

7. The method of claim 1, further comprising:

receiving a second sidelink coordination message including the identifier associated with the third UE and indicating the first set of sidelink resources, wherein determining the reservation of the first set of sidelink resources is based at least in part on receiving the second sidelink coordination message.

8. The method of claim 1, further comprising:

removing, from a set of candidate sidelink resources including the first set of sidelink resources and the second set of sidelink resources, sidelink resources associated with one or more slots based at least in part on the reservation of the first set of sidelink resources and the reference signal received power associated with the sidelink coordination message, the first set of sidelink resources corresponding to the one or more slots, wherein selecting the second set of sidelink resources is based at least in part on removing the sidelink resources from the set of candidate sidelink resources.

9. The method of claim 1, further comprising:

removing, from a third set of sidelink resources including the first set of sidelink resources and the second set of sidelink resources, sidelink resources associated with one or more slots based at least in part on the reservation of the first set of sidelink resources and the reference signal received power associated with the sidelink coordination message, the first set of sidelink resources corresponding to the one or more slots; and reporting the third set of sidelink resources to a medium access control layer associated with the first UE, wherein selecting the second set of sidelink resources is based at least in part on signaling the third set of sidelink resources.

10. The method of claim 1, further comprising:

refraining from selecting sidelink resources in a first set of slots associated with the first set of sidelink resources for the second sidelink communication based at least in part on the reference signal received power associated with the sidelink coordination message, wherein the second set of sidelink resources are associated with a second set of slots different from the first set of slots.

11. The method of claim 1, wherein selecting the second set of sidelink resources comprises:

selecting the second set of sidelink resources in a first slot that is non-overlapping in a time domain with a second slot associated with the first set of sidelink resources.

12. The method of claim 1, further comprising:

measuring the reference signal received power associated with the sidelink coordination message based at least in part on receiving the sidelink coordination message; and normalizing the reference signal received power associated with the sidelink coordination message based at least in part on a quantity of subchannels associated with sidelink communications between the first UE and the second UE, wherein selecting the second set of sidelink resources is based at least in part on the normalized reference signal received power.

13. The method of claim 1, further comprising:

determining the reservation of the first set of sidelink resources based at least in part on receiving a broadcast message that includes the identifier associated with the third UE, receiving a groupcast message that includes the identifier associated with the third UE, a distance associated with the groupcast message, or a combination thereof.

14. The method of claim 1, wherein the set of identifiers includes identifiers associated with UEs from which the second UE receives sidelink messages.

15. The method of claim 1, wherein the set of identifiers includes identifiers associated with UEs for which a second reference signal received power between the second UE and a respective UE satisfies a threshold reference signal received power.

16. A method for wireless communication at a first user equipment (UE), comprising:

transmitting, to a second UE, a sidelink coordination message including a set of identifiers associated with a set of UEs; and receiving, from the second UE, a first sidelink communication over a first set of sidelink resources, the first set of sidelink resources selected based at least in part on a reference signal received power associated with the sidelink coordination message and a reservation of a second set of sidelink resources for a second sidelink communication between the first UE and a third UE of the set of UEs.

17. The method of claim 16, wherein the sidelink coordination message indicates a second reference signal received power associated with communications between the first UE and the third UE.

18. The method of claim 17, further comprising:

measuring a third reference signal received power of a sidelink message received from the third UE; and quantizing the third reference signal received power in accordance with a set of reference signal received power ranges, wherein the second reference signal received power corresponds to the quantized third reference signal received power.

19. The method of claim 18, further comprising:

receiving a configuration message that indicates the set of reference signal received power ranges.

20. The method of claim 18, wherein a first reference signal received power range of the set of reference signal received power ranges is associated with a first step size different from a second step size associated with a second reference signal received power range of the set of reference signal received power ranges.

21. The method of claim 17, wherein receiving the first sidelink communication over the first set of sidelink resources is based at least in part on a ratio of the reference signal received power and the second reference signal received power satisfying a threshold ratio.

22. The method of claim 17, wherein receiving the first sidelink communication over the first set of sidelink resources is based at least in part on a difference between the reference signal received power and the second reference signal received power satisfying a threshold difference.

23. The method of claim 16, wherein receiving the first sidelink communication over the first set of sidelink resources is based at least in part on the reference signal received power satisfying a threshold reference signal received power.

24. The method of claim 16, further comprising:

transmitting, to the second UE, a second sidelink coordination message including an identifier of the set of identifiers associated with the third UE and indicating the second set of sidelink resources, wherein receiving the first sidelink communication over the first set of sidelink resources is based at least in part on transmitting the second sidelink coordination message.

25. The method of claim 16, wherein the set of identifiers includes identifiers associated with UEs from which the first UE receives sidelink messages.

26. The method of claim 16, wherein the set of identifiers includes identifiers associated with UEs for which a second reference signal received power between the first UE and a respective UE satisfies a threshold reference signal received power.

27. The method of claim 26, further comprising:

receiving a configuration message that indicates the threshold reference signal received power.

* * * * *